(12) United States Patent
Raghavan et al.

(10) Patent No.: US 12,224,839 B2
(45) Date of Patent: Feb. 11, 2025

(54) METHOD FOR INDICATING A BEAM CORRESPONDENCE FAILURE

(71) Applicant: QUALCOMM Incorporated, San Diego, CA (US)

(72) Inventors: Vasanthan Raghavan, West Windsor Township, NJ (US); Juergen Cezanne, Ocean Township, NJ (US); Junyi Li, Franklin Park, NJ (US); Allen Minh-Triet Tran, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 17/216,517

(22) Filed: Mar. 29, 2021

(65) Prior Publication Data

US 2022/0311497 A1    Sep. 29, 2022

(51) Int. Cl.
| | | |
|---|---|---|
| *H04B 7/06* | (2006.01) | |
| *H04B 7/08* | (2006.01) | |
| *H04W 16/28* | (2009.01) | |
| *H04W 24/08* | (2009.01) | |
| *H04W 76/19* | (2018.01) | |

(52) U.S. Cl.
CPC ......... *H04B 7/0695* (2013.01); *H04W 16/28* (2013.01); *H04W 24/08* (2013.01); *H04W 76/19* (2018.02)

(58) Field of Classification Search
CPC ..... H04B 7/0695; H04B 7/088; H04W 16/28; H04W 24/08; H04W 76/19
See application file for complete search history.

(56) References Cited

U.S. PATENT DOCUMENTS

| | | | |
|---|---|---|---|
| 2019/0074891 A1* | 3/2019 | Kwon | H04L 5/0048 |
| 2019/0260120 A1* | 8/2019 | Khushrushahi | H01Q 19/062 |
| 2019/0349960 A1* | 11/2019 | Li | H04W 72/569 |
| 2019/0393729 A1* | 12/2019 | Contopanagos | H01Q 21/24 |
| 2020/0007196 A1* | 1/2020 | Cao | H04B 7/0617 |
| 2021/0258061 A1* | 8/2021 | Harrebek | H04B 7/0404 |
| 2021/0296782 A1* | 9/2021 | Mori | H01Q 21/061 |
| 2021/0320712 A1 | 10/2021 | Goettle | |

(Continued)

FOREIGN PATENT DOCUMENTS

WO    WO-2018141111 A1 *    8/2018    ........... H04B 7/0408

*Primary Examiner* — Harry H Kim
(74) *Attorney, Agent, or Firm* — Loza & Loza, LLP

(57) ABSTRACT

A first wireless communication device, such as a base station, may include separate transmit and receive antenna arrays. The separation between the transmit and receive antenna arrays may cause a direction of a transmit beam formed at the transmit antenna array to be different from a direction of a receive beam formed at the receive antenna array. The transmit and receive beams may be formed for communication with a second wireless communication device, such as a user equipment (UE). The described aspects enable the first wireless communication device to monitor a difference between a first direction of the transmit beam and a second direction of the receive beam. The first wireless communication device may transmit an indication of a beam correspondence failure to the second wireless communication device when the difference between the first and second directions is greater than or equal to a beam correspondence threshold.

30 Claims, 23 Drawing Sheets

(56) References Cited

U.S. PATENT DOCUMENTS

| | | | | |
|---|---|---|---|---|
| 2021/0368358 | A1* | 11/2021 | Sheng | G01S 5/0036 |
| 2022/0124695 | A1* | 4/2022 | Caporal Del Barrio | H04L 5/0048 |
| 2022/0312339 | A1* | 9/2022 | Logothetis | H04B 7/043 |
| 2022/0376768 | A1* | 11/2022 | Harrebek | H04L 5/0053 |
| 2022/0399927 | A1* | 12/2022 | Tsai | H04B 7/0617 |
| 2023/0412236 | A1* | 12/2023 | Kalantari | H04B 7/088 |

\* cited by examiner

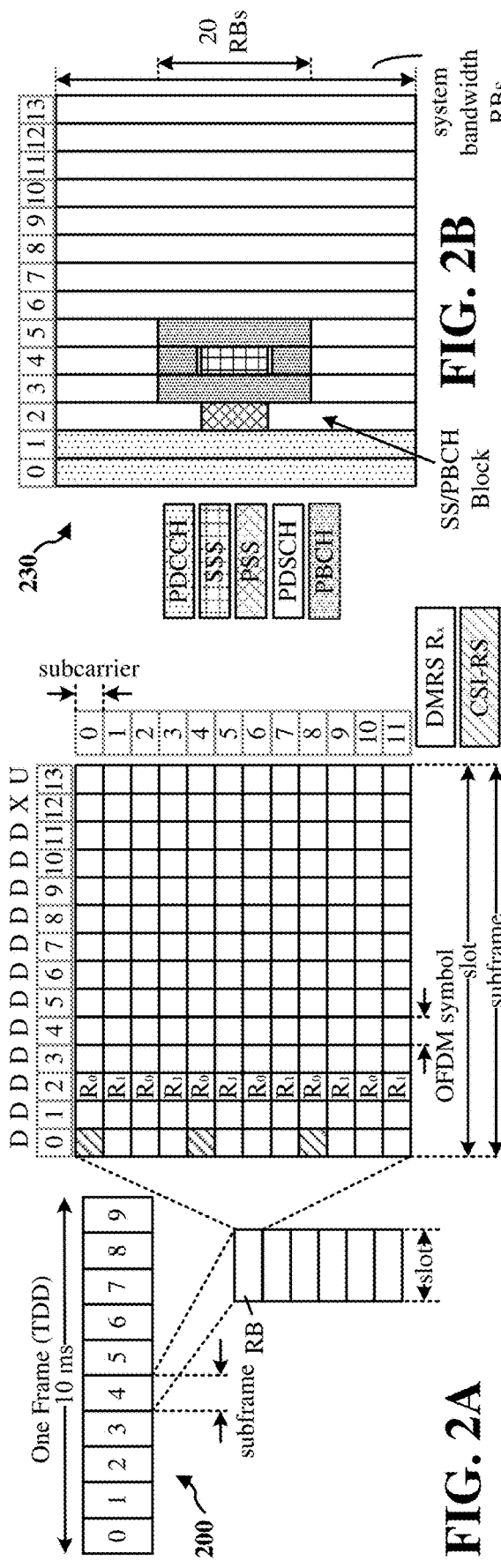
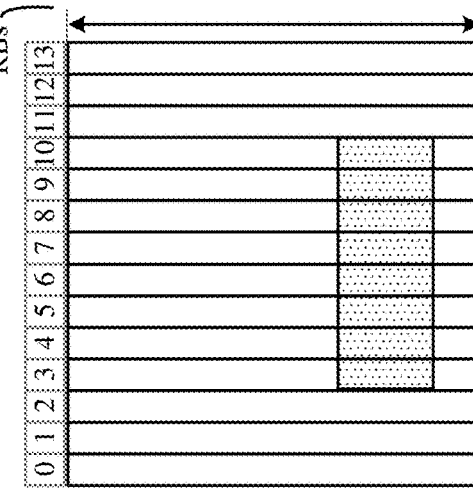
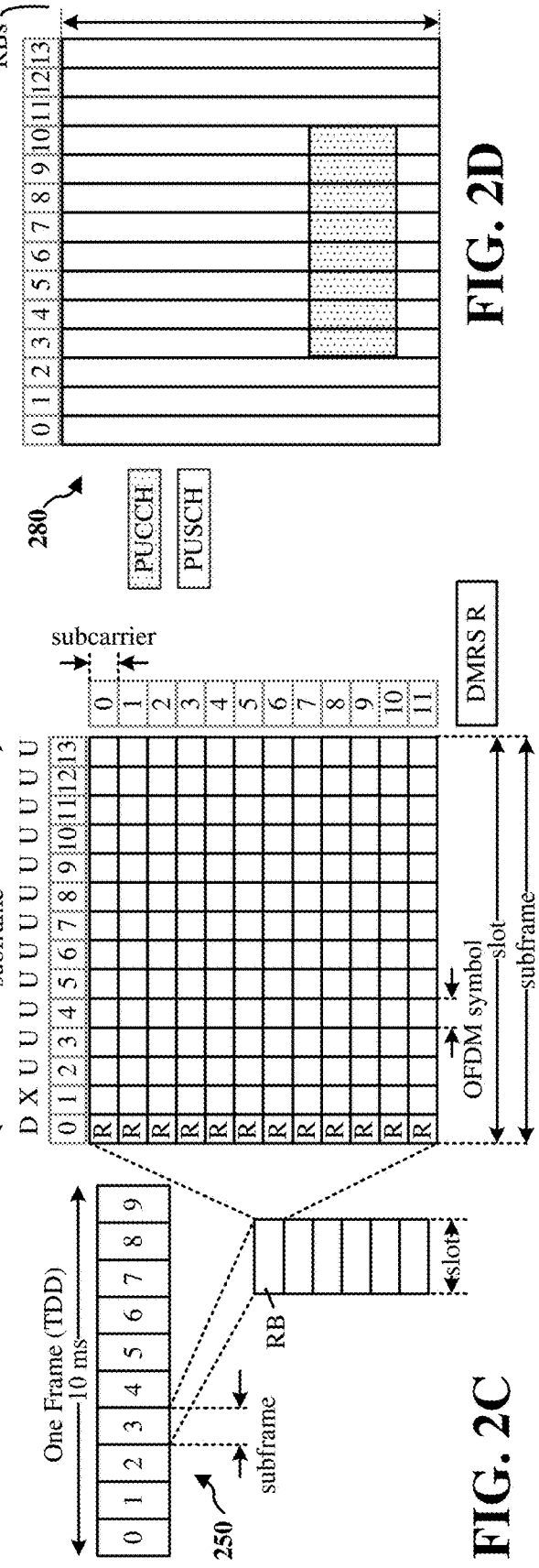

METHOD FOR INDICATING A BEAM CORRESPONDENCE FAILURE

BACKGROUND

Technical Field

The present disclosure relates generally to communication systems, and more particularly, to a method for indicating beam correspondence failure.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A first wireless communication device, such as a base station, may include separate transmit (Tx) and receive (Rx) antenna arrays. The separation between the Tx and Rx antenna arrays may cause a direction of a transmit beam formed at the Tx antenna array to be different from a direction of a receive beam formed at the Rx antenna array when the first wireless communication device assumes channel reciprocity (or beam correspondence) between uplink and downlink. The transmit and receive beams may be formed for communication with a second wireless communication device, such as a user equipment (UE).

In the aspects described herein, the first wireless communication device including separate Tx and Rx antenna arrays may dynamically determine any occurrences of beam correspondence failures by monitoring the difference between the direction of a transmit beam and the direction of a receive beam. The first wireless communication device may compare the difference between the direction of the transmit beam and the direction of the receive beam to an appropriate beam correspondence threshold to determine any occurrences of beam correspondence failures and to indicate the occurrences of beam correspondence failures to the second wireless communication device. This may enable the first wireless communication device to assume channel reciprocity when forming the transmit and receive beams for communication with the second wireless communication device (e.g., a UE), and to selectively perform a separate beam training procedure for the receive beam and/or the transmit beam when a beam correspondence failure is determined.

In an aspect of the disclosure, a method, a computer-readable medium, and an apparatus are provided. The apparatus may be a first wireless communication device including a transmit antenna array and a receive antenna array, the transmit antenna array being separate from the receive antenna array. The first wireless communication device forms a transmit beam in a first direction at the transmit antenna array and a receive beam in a second direction at the receive antenna array, wherein the transmit beam and the receive beam are formed for communication with a second wireless communication device. The first wireless communication device monitors a difference between the first direction of the transmit beam and the second direction of the receive beam. The first wireless communication device transmits an indication of a beam correspondence failure to the second wireless communication device when the difference between the first direction and the second direction is greater than or equal to a beam correspondence threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
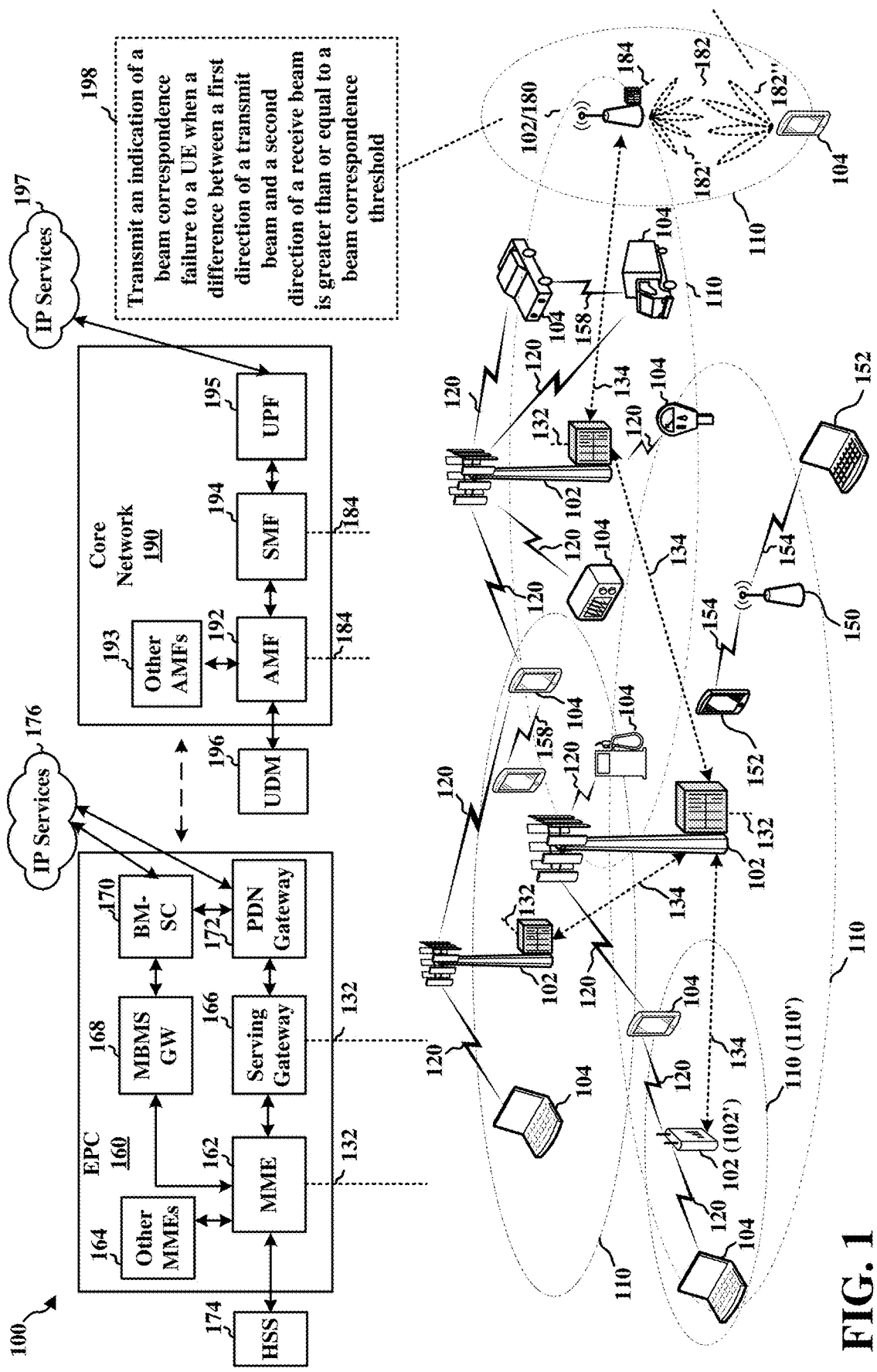
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may be configured to transmit an indication of a beam correspondence failure to a UE (e.g., UE 104) when a difference between a first direction of a transmit beam formed at a transmit (Tx) antenna array and a second direction of a receive beam formed at a receive (Rx) antenna array is greater than or equal to a beam correspondence threshold (198). Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2 slots/subframe. The subcarrier spacing and symbol length/duration are a function of the numerology. The subcarrier spacing may be equal to $2^{\mu}*15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
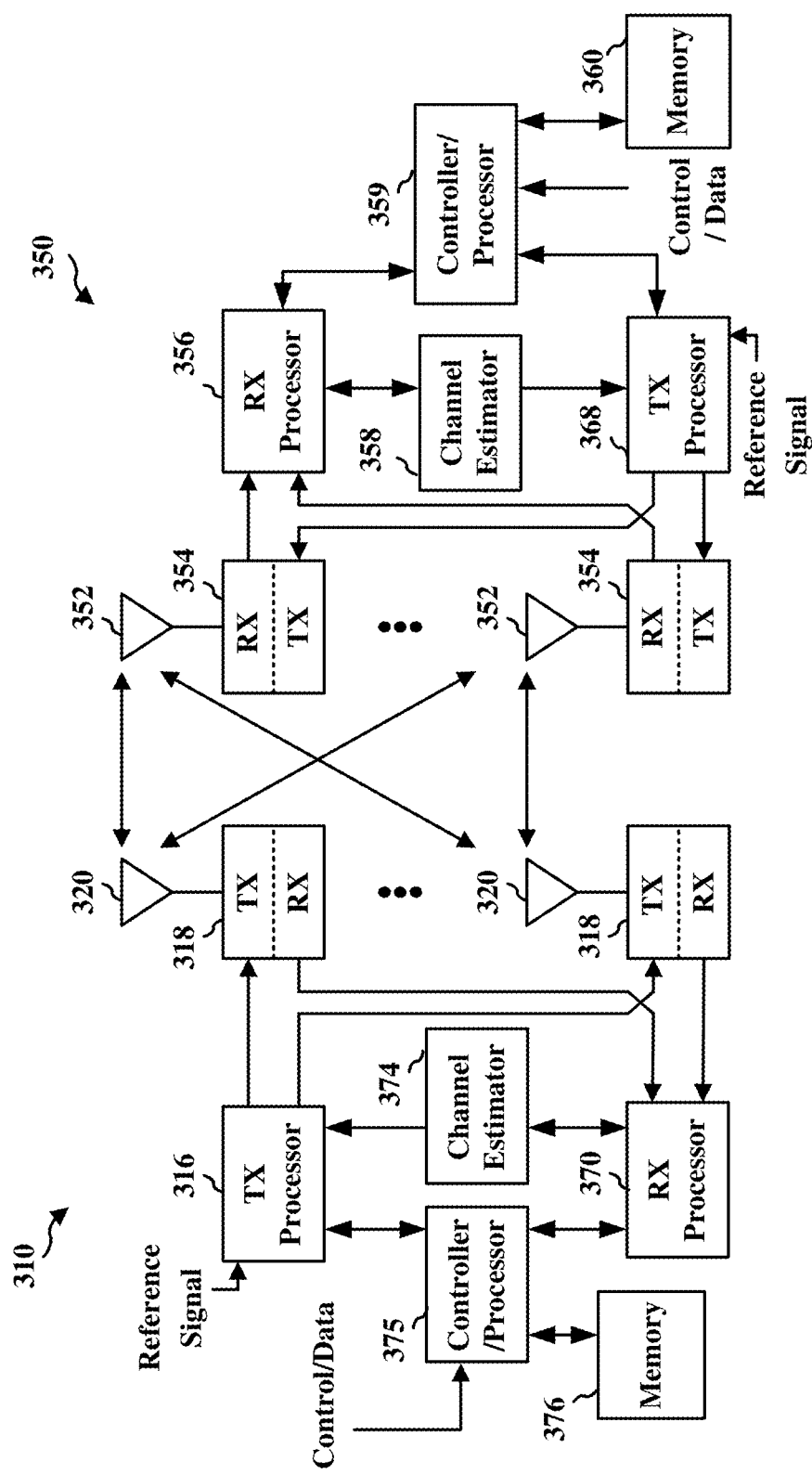
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 198 of FIG. 1.

The concept of beam correspondence assumes that the optimum downlink (DL) transmitter/receiver beam pair between two wireless communication devices is also the optimum uplink (UL) transmitter/receiver beam pair with some radio frequency (RF) level adjustment of beam weights to capture calibration errors between DL and UL circuitry. Accordingly, a wireless communication device (e.g., a base station, a UE) may implement a beam correspondence feature in a wireless communication network (e.g., a 5G NR network) to determine beam weights for a receive beam (e.g., for receiving uplink (UL) signals or (DL) signals) based on one or more measurements of a transmit beam (e.g., for transmitting downlink (DL) signals or (UL) signals), or to determine beam weights for a transmit beam based on one or more measurements of a receive beam.

For example, a base station may receive a report from a UE indicating the signal strengths (e.g., reference signal received power (RSRP) measurements) of DL transmit beams formed at the base station and may determine the best DL transmit beam based on the report. The base station may assume channel reciprocity between the base station and the UE and may determine the beam weights for steering the direction of a UL receive beam based on the best DL transmit beam and RF/antenna asymmetries. The base station may then use the beam weights to form a UL receive beam to receive wireless communications from the UE. In this example, since the direction of the DL transmit beam corresponds to the direction of the UL receive beam, the DL transmit beam and the UL receive beam may be said to have beam correspondence.

Therefore, by forming the UL receive beam based on the DL transmit beam, the base station may avoid a separate beam training procedure for the UL receive beam and may avoid delays resulting from such separate beam training procedure. This also leads to power savings since a separate beam training procedure is avoided. It should be noted that in some low-tier devices (e.g., UEs with reduced capabilities relative to premium UEs, such as smartphones), beam correspondence capability may not be available. This may increase signaling overhead due to the need for separate UL and DL beam training procedures.

In an antenna array that includes a transmit antenna array and a receive antenna array, some components of the transmit antenna array (e.g., transmit (Tx) antenna elements) and some components of the receive antenna array (e.g., receive (Rx) antenna elements), may be co-located. However, the high power consumption and increased operating temperatures of the co-located Tx and Rx antenna elements in the antenna array may be difficult to manage and may compromise the operation and/or the longevity of the antenna array. These effects may be exacerbated as the size of the antenna array (e.g., the number of co-located Tx and Rx antenna elements forming the antenna array) and/or the carrier frequency increases. Moreover, feed-line crossings in an antenna array including co-located Tx and Rx antenna elements may significantly increase circuit design complexity as the size of the antenna array increases.

To avoid or reduce the previously discussed drawbacks associated with co-located Tx and Rx antenna elements, the Tx antenna elements and the Rx antenna elements may not be co-located (also referred to as non-co-located Tx and RX antenna elements or separated Tx and RX antenna elements). For example, the Tx antenna elements may be separated from the Rx antenna elements, such that the Tx antenna elements are situated apart from the Rx antenna elements. In some examples, antenna arrays with non-co-located Tx and Rx antenna elements may be implemented in wireless communication devices that may accommodate large antenna arrays, such as base stations, customer premises equipments (CPEs), and/or integrated access and backhaul (JAB) nodes. In some examples, antenna arrays with non-co-located Tx and Rx antenna elements may be implemented in wireless communication devices that may not have space for accommodating antenna arrays with large footprints, such as UEs and/or CPEs, when the wireless communication devices are configured to operate at higher frequency bands (e.g., FR4 or greater).

Figure 4:
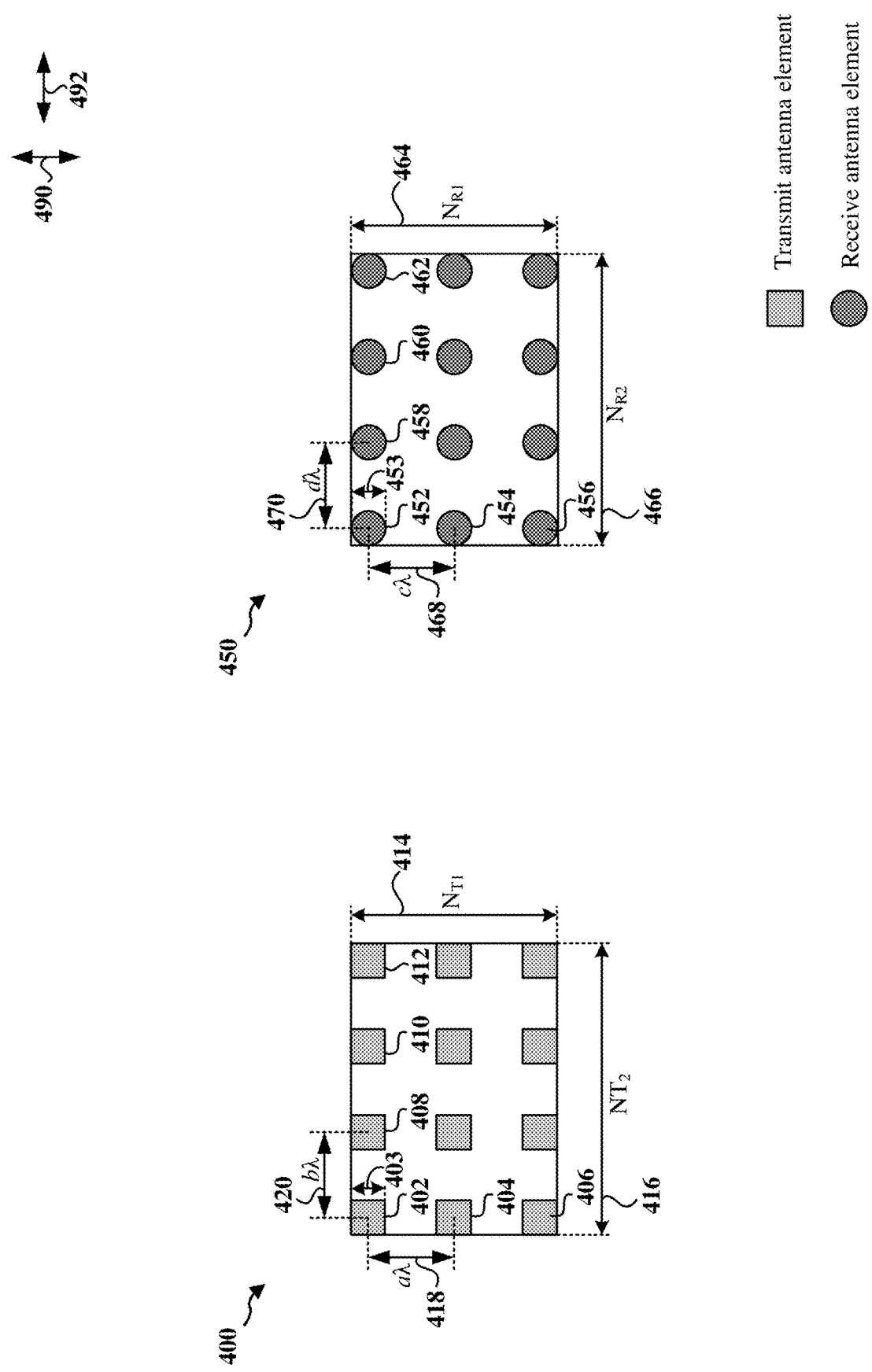
FIG. 4 illustrates separate transmit (Tx) and receive (Rx) antenna arrays.

FIG. 4 illustrates separate Tx and Rx antenna arrays, such as the Tx antenna array 400 and the Rx antenna array 450. The Tx antenna array 400 includes a set of Tx antenna elements, such as Tx antenna elements 402, 404, 406, 408, 410, 412. In some examples, each of the Tx antenna elements in the Tx antenna array 400 may be approximately equal in size and may be described as to be in a square shape (even though the actual antenna element may be in a different shape), such as the Tx antenna element 402 with side dimension 403. The Tx antenna elements in each column (e.g., Tx antenna elements 402, 404, 406) of the Tx antenna array 400 may have uniform spacing and may be spaced apart by a center-to-center distance 418 (also referred to as inter-antenna element spacing 418). The Tx antenna elements in each row (e.g., Tx antenna elements 402, 408,

410, 412) of the Tx antenna array 400 may have uniform spacing and may be spaced apart by a center-to-center distance 420 (also referred to as inter-antenna element spacing 420). As shown in FIG. 4, the expression $a\lambda$ may represent the value of the distance 418, where a is a positive number representing the spacing factor for Tx antenna elements in each column and represents a wavelength. As further shown in FIG. 4, the expression $b\lambda$ may represent the value of the distance 420, where b is a positive number representing the spacing factor for Tx antenna elements in each row.

The size of the Tx antenna array 400 may be expressed in terms of the number of antenna elements $N_{T1}$ 414 in each column of the Tx antenna array 400 and the number of antenna elements $N_{T2}$ 416 in each row of the Tx antenna array 400. Accordingly, the size of the Tx antenna array 400 may be expressed as $N_{T1} \times N_{T2}$. In the example of FIG. 4, since the Tx antenna array 400 includes three Tx antenna elements in each column (e.g., $N_{T1}=3$) and four Tx antenna elements in each row (e.g., $N_{T2}=4$), the size of the Tx antenna array 400 may be described as a three by four antenna array including 12 Tx antenna elements (e.g., 3×4=12 Tx antenna elements).

The Rx antenna array 450 includes a set of Rx antenna elements, such as Rx antenna elements 452, 454, 456, 458, 460, 462. In some examples, each of the Rx antenna elements in the Rx antenna array 450 may be approximately equal in size and may have a circular shape, such as the Rx antenna element 452 with diameter 453. The Rx antenna elements in each column (e.g., Rx antenna elements 452, 454, 456) of the Tx antenna array 400 may have uniform spacing and may be spaced apart by a center-to-center distance 468 (also referred to as inter-antenna element spacing 468). The Rx antenna elements in each row (e.g., Rx antenna elements 452, 458, 460, 462) of the Rx antenna array 450 may have uniform spacing and may be spaced apart by a center-to-center distance 470 (also referred to as inter-antenna element spacing 470). As shown in FIG. 4, the expression $c\lambda$ may represent the value of the distance 468, where c is a positive number representing the spacing factor for Rx antenna elements in each column and $\lambda$ represents a wavelength. As further shown in FIG. 4, the expression $d\lambda$ may represent the value of the distance 470, where d is a positive number representing the spacing factor for Rx antenna elements in each row.

The size of the Rx antenna array 450 may be expressed in terms of the number of antenna elements $N_{R1}$ 464 in each column of the Rx antenna array 450 and the number of antenna elements $N_{R2}$ 466 in each row of the Rx antenna array 450. Accordingly, the size of the Rx antenna array 450 may be expressed as $N_{R1} \times N_{R2}$. In the example of FIG. 4, since the Rx antenna array 450 includes three Rx antenna elements in each column (e.g., $N_{R1}=3$) and four Rx antenna elements in each row (e.g., $N_{R2}=4$), the size of the Rx antenna array 450 may be described as a three by four antenna array including 12 Rx antenna elements (e.g., 3×4=12 Rx antenna elements).

In some examples, separate Tx and Rx antenna arrays (or antenna arrays with non-co-located Tx and Rx antenna elements) may have different array sizes for different frequencies. For example, some RF components in a Tx antenna array may consume more power, may occupy more area (e.g., may have a larger footprint), and/or may be more costly as compared to RF components in an Rx antenna array. This may be the case, for example, when a Tx antenna array is configured to operate with a power amplifier (PA) and the Rx antenna array is configured to operate with a low noise amplifier (LNA). In one example, the size (e.g., $N_{T1} \times N_{T2}$) of the Tx antenna array 400 may be different from the size (e.g., $N_{R1} \times N_{R2}$) of the Rx antenna array 450.

In some examples, separate Tx and Rx antenna arrays (or antenna arrays with non-co-located Tx and Rx antenna elements) may have different inter-antenna element spacings in the vertical direction 490 (e.g., different spacing for Tx and Rx antenna elements along a column in an antenna array) and in the horizontal direction 492 (e.g., different spacing for Tx and Rx antenna elements along a row in an antenna array). In one example, and as previously described, the Tx antenna array 400 may have a size $N_{T1} \times N_{T2}$, an inter-antenna element spacing $a\lambda$ for Tx antenna elements along each column, and an inter-antenna element spacing $b\lambda$ for Tx antenna elements along each row. In this example, the value of the spacing factor a may be different from the value of the spacing factor b. In another example, and as previously described, the Rx antenna array 450 may have a size $N_{R1} \times N_{R2}$, an inter-antenna element spacing $c\lambda$ for Rx antenna elements along each column, and an inter-antenna element spacing $d\lambda$ for Rx antenna elements along each row. In this example, the value of the spacing factor c may be different from the value of the spacing factor d.

Figure 5:
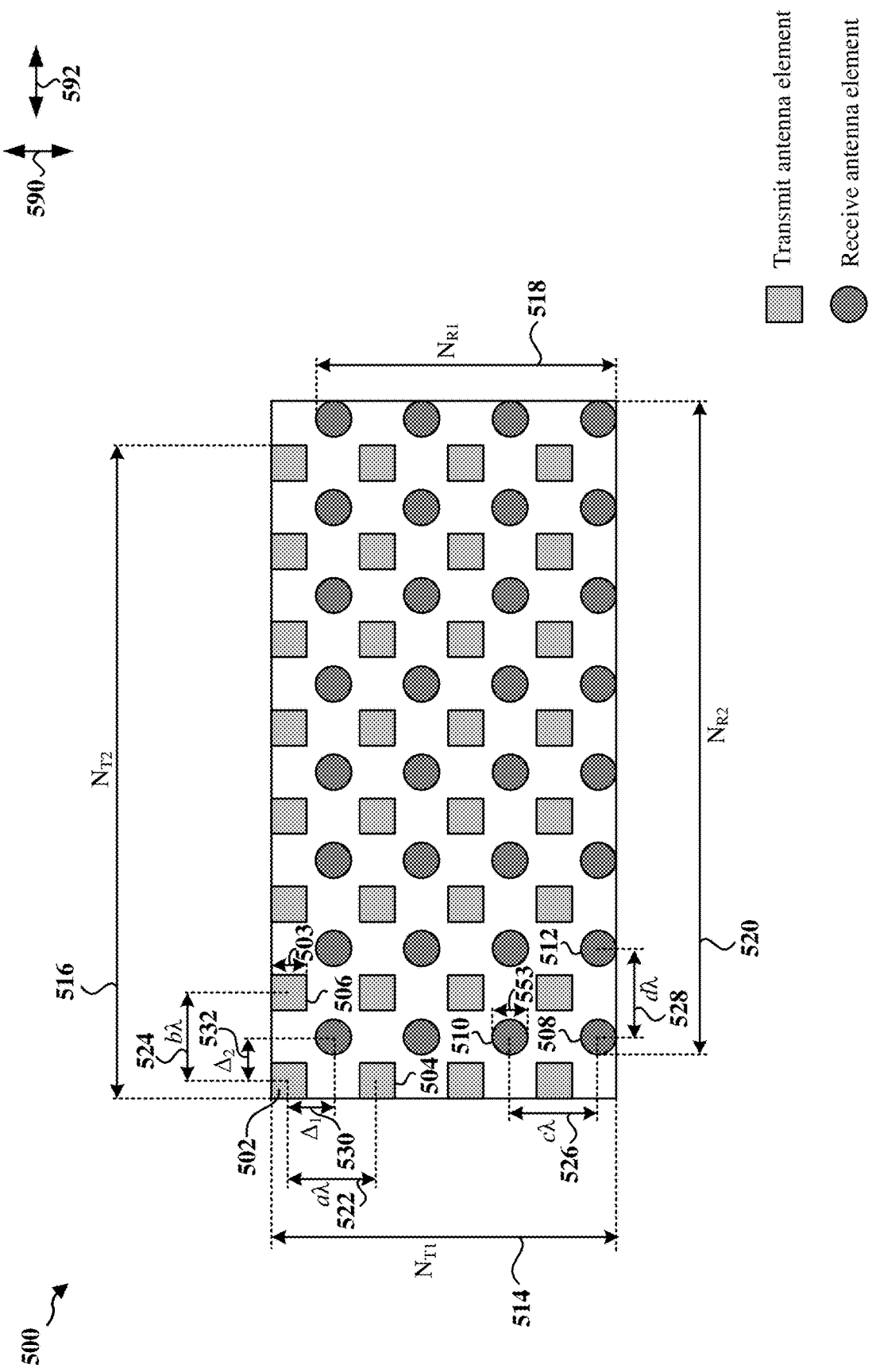
FIG. 5 illustrates an antenna including an example implementation of separate Tx and Rx antenna arrays.

FIG. 5 illustrates an antenna 500 including an example implementation of separate Tx and Rx antenna arrays. FIG. 5 includes a Tx antenna array including a set of Tx antenna elements, such as Tx antenna elements 502, 504, 506, and an Rx antenna array including a set of Rx antenna elements, such as Rx antenna elements 508, 510, 512. In some examples, each of the Tx antenna elements may be approximately equal in size and may have a square shape, such as the Tx antenna element 506 with side dimension 503. The Tx antenna elements in each column (e.g., Tx antenna elements 502, 504) may have uniform spacing and may be spaced apart by a center-to-center distance 522 (also referred to as inter-antenna element spacing 522). The Tx antenna elements in each row (e.g., Tx antenna elements 502, 506) may have uniform spacing and may be spaced apart by a center-to-center distance 524 (also referred to as inter-antenna element spacing 524). As shown in FIG. 5, the expression $a\lambda$ may represent the value of the distance 522, where a is a positive number representing the spacing factor for Tx antenna elements in each column and $\lambda$ represents a wavelength. As further shown in FIG. 5, the expression $b\lambda$ may represent the value of the distance 524, where b is a positive number representing the spacing factor for Tx antenna elements in each row.

The size of the Tx antenna array may be expressed in terms of the number of antenna elements $N_{T1}$ 514 in each column of the Tx antenna array and the number of antenna elements $N_{T2}$ 516 in each row of the Tx antenna array. Accordingly, the size of the Tx antenna array may be expressed as $N_{T1} \times N_{T2}$. In the example of FIG. 5, since the Tx antenna array includes four Tx antenna elements in each column (e.g., $N_{T1}=4$) and eight Tx antenna elements in each row (e.g., $N_{T2}=8$), the size of the Tx antenna array may be described as a four by eight antenna array including 32 Tx antenna elements (e.g., 4×8=32 Tx antenna elements).

The Rx antenna array includes a set of Rx antenna elements, such as Rx antenna elements 508, 510, 512. In some examples, each of the Rx antenna elements in the Rx antenna array may be approximately equal in size and may have a circular shape, such as the Rx antenna element 510 with diameter 553. The Rx antenna elements in each column (e.g., Rx antenna elements 508, 510) of the Rx antenna array may have uniform spacing and may be spaced apart by a center-to-center distance 526 (also referred to as inter-antenna element spacing 526). The Rx antenna elements in each row (e.g., Rx antenna elements 508, 512) of the Rx antenna array may have uniform spacing and may be spaced apart by a center-to-center distance 528 (also referred to as inter-antenna element spacing 528). As shown in FIG. 5, the expression cλ may represent the value of the distance 526, where c is a positive number representing the spacing factor for Rx antenna elements in each column and λ represents a wavelength. As further shown in FIG. 5, the expression dλ may represent the value of the distance 528, where d is a positive number representing the spacing factor for Rx antenna elements in each row.

The size of the Rx antenna array may be expressed in terms of the number of antenna elements $N_{R1}$ 518 in each column of the Rx antenna array and the number of antenna elements $N_{R2}$ 520 in each row of the Rx antenna array. Accordingly, the size of the Rx antenna array may be expressed as $N_{R1} \times N_{R2}$. In the example of FIG. 5, since the Rx antenna array includes four Rx antenna elements in each column (e.g., $N_{R1}$=4) and eight Rx antenna elements in each row (e.g., $N_{R2}$=8), the size of the Rx antenna array may be described as a four by eight antenna array including 32 Rx antenna elements (e.g., 4×8=32 Rx antenna elements).

In the example of FIG. 5, the values of a, b, c, and d may be set to 0.5, such that each of the distances 522, 524, 526, 528 is expressed as 0.5λ. In FIG. 5, the Tx antenna array is offset from the Rx antenna array in the vertical direction 590 by a first offset distance ($\Delta_1$) 530, and may be offset from the Rx antenna array in the horizontal direction 592 by a second offset distance ($\Delta_2$) 532. In the example of FIG. 5, if the distances 522, 524, 526, 528 are set to 0.5λ, then $\Delta_1=\Delta_2=0.25$.

Figure 6:
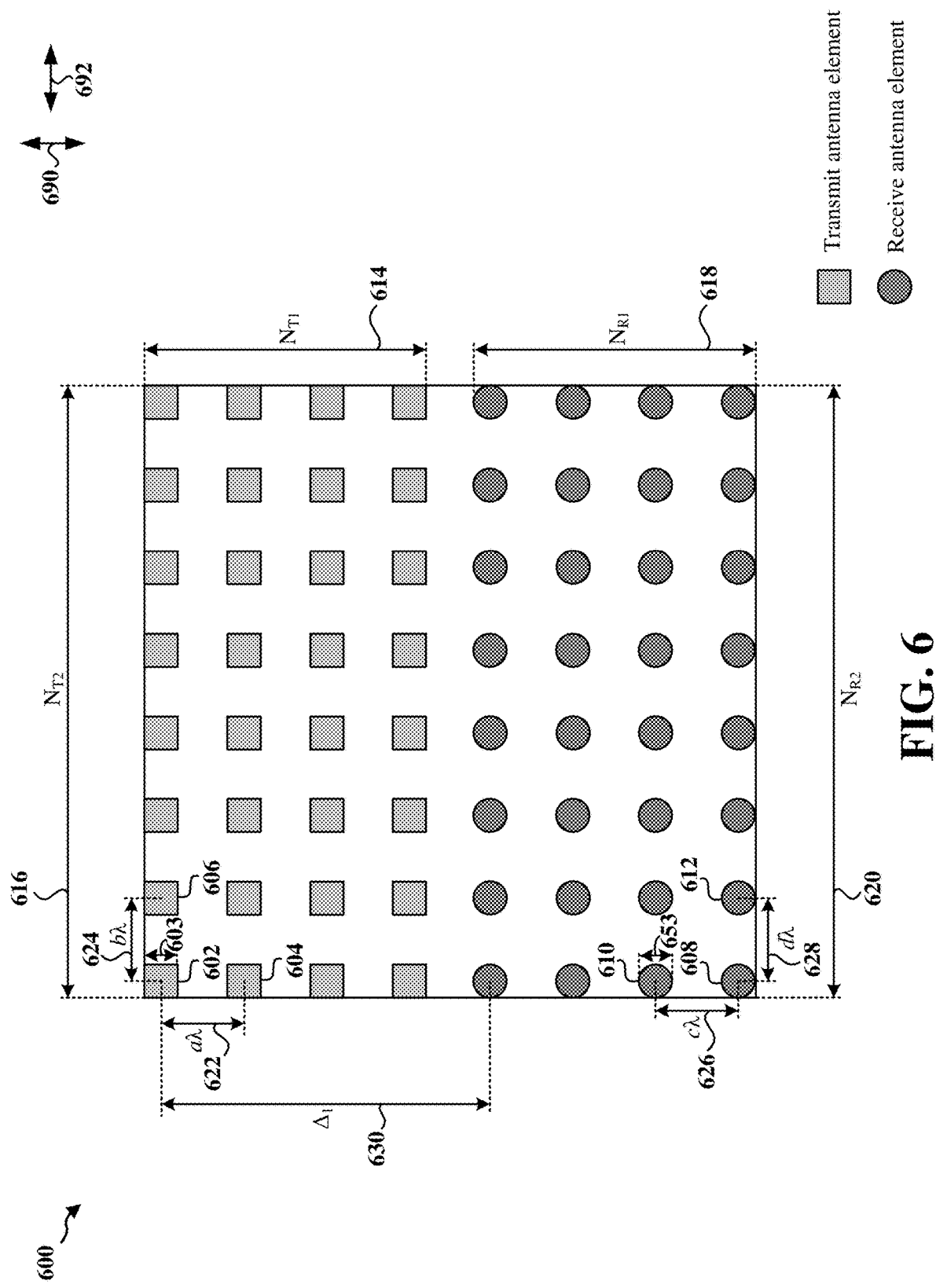
FIG. 6 illustrates an antenna including an example implementation of separate Tx and Rx antenna arrays.

FIG. 6 illustrates an antenna 600 including an example implementation of separate Tx and Rx antenna arrays. FIG. 6 includes a Tx antenna array including a set of Tx antenna elements, such as Tx antenna elements 602, 604, 606, and an Rx antenna array including a set of Rx antenna elements, such as Rx antenna elements 608, 610, 612. In some examples, each of the Tx antenna elements may be approximately equal in size and may have a square shape, such as the Tx antenna element 602 with side dimension 603. The Tx antenna elements in each column (e.g., Tx antenna elements 602, 604) may have uniform spacing and may be spaced apart by a center-to-center distance 622 (also referred to as inter-antenna element spacing 622). The Tx antenna elements in each row (e.g., Tx antenna elements 602, 606) may have uniform spacing and may be spaced apart by a center-to-center distance 624 (also referred to as inter-antenna element spacing 624). As shown in FIG. 6, the expression aλ may represent the value of the distance 622, where a is a positive number representing the spacing factor for Tx antenna elements in each column and λ represents a wavelength. As further shown in FIG. 6, the expression bλ may represent the value of the distance 624, where b is a positive number representing the spacing factor for Tx antenna elements in each row.

The size of the Tx antenna array may be expressed in terms of the number of antenna elements $N_{T1}$ 614 in each column of the Tx antenna array and the number of antenna elements $N_{T2}$ 616 in each row of the Tx antenna array. Accordingly, the size of the Tx antenna array may be expressed as $N_{T1} \times N_{T2}$. In the example of FIG. 6, since the Tx antenna array includes four Tx antenna elements in each column (e.g., $N_{T1}$=4) and eight Tx antenna elements in each row (e.g., $N_{T2}$=8), the size of the Tx antenna array may be described as a four by eight antenna array including 32 Tx antenna elements (e.g., 4×8=32 Tx antenna elements).

The Rx antenna array includes a set of Rx antenna elements, such as Rx antenna elements 608, 610, 612. In some examples, each of the Rx antenna elements in the Rx antenna array may be approximately equal in size and may have a circular shape, such as the Rx antenna element 610 with diameter 653. The Rx antenna elements in each column (e.g., Rx antenna elements 608, 610) of the Rx antenna array may have uniform spacing and may be spaced apart by a center-to-center distance 626 (also referred to as inter-antenna element spacing 626). The Rx antenna elements in each row (e.g., Rx antenna elements 608, 612) of the Rx antenna array may have uniform spacing and may be spaced apart by a center-to-center distance 628 (also referred to as inter-antenna element spacing 628). As shown in FIG. 6, the expression cλ may represent the value of the distance 626, where c is a positive number representing the spacing factor for Rx antenna elements in each column and represents a wavelength. As further shown in FIG. 6, the expression dλ may represent the value of the distance 628, where d is a positive number representing the spacing factor for Rx antenna elements in each row.

The size of the Rx antenna array may be expressed in terms of the number of antenna elements $N_{R1}$ 618 in each column of the Rx antenna array and the number of antenna elements $N_{R2}$ 620 in each row of the Rx antenna array. Accordingly, the size of the Rx antenna array may be expressed as $N_{R1} \times N_{R2}$. In the example of FIG. 6, since the Rx antenna array includes four Rx antenna elements in each column (e.g., $N_{R1}$=4) and eight Rx antenna elements in each row (e.g., $N_{R2}$=8), the size of the Rx antenna array may be described as a four by eight antenna array including 32 Rx antenna elements (e.g., 4×8=32 Rx antenna elements).

In the example of FIG. 6, the values of a, b, c, and d may be set to 0.5, such that each of the distances 622, 624, 626, 628 is expressed as 0.5λ. In FIG. 6, the Tx antenna array is offset from the Rx antenna array in the vertical direction 690 by a first offset distance ($\Delta_1$) 630. In the example of FIG. 6, if the distances 622 is set to 0.5λ, then $\Delta_1=(4)0.5\lambda=2\lambda$. It should be noted that the Tx antenna array is not offset from the Rx antenna array in the horizontal direction 692.

Figure 7:
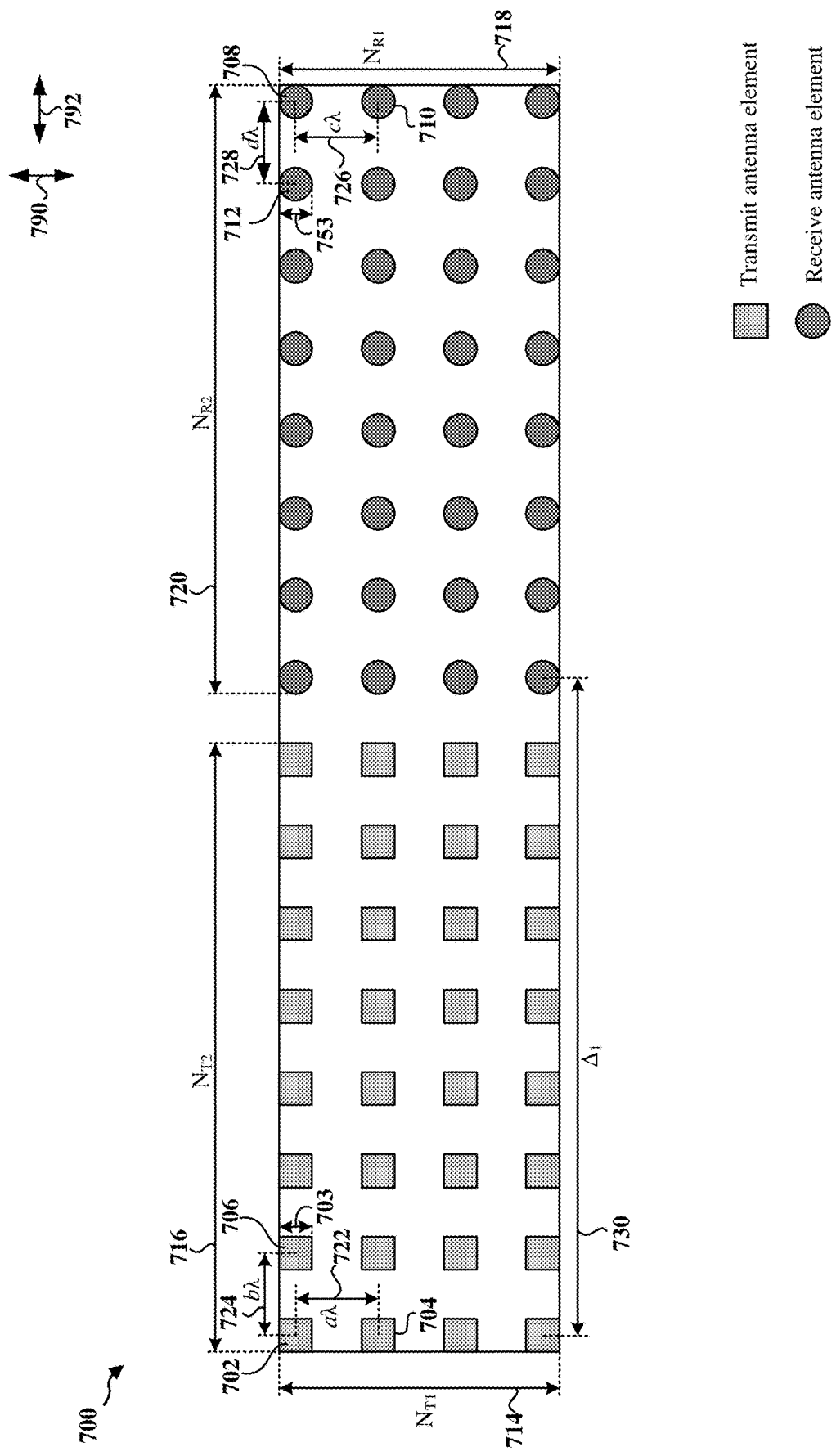
FIG. 7 illustrates an antenna including an example implementation of separate Tx and Rx antenna arrays.

FIG. 7 illustrates an antenna 700 including an example implementation of separate Tx and Rx antenna arrays. FIG. 7 includes a Tx antenna array including a set of Tx antenna elements, such as Tx antenna elements 702, 704, 706, and an Rx antenna array including a set of Rx antenna elements, such as Rx antenna elements 708, 710, 712. In some examples, each of the Tx antenna elements may be approximately equal in size and may have a square shape, such as the Tx antenna element 706 with side dimension 703. The Tx antenna elements in each column (e.g., Tx antenna elements 702, 704) may have uniform spacing and may be spaced apart by a center-to-center distance 722 (also referred to as inter-antenna element spacing 722). The Tx antenna elements in each row (e.g., Tx antenna elements 702, 706) may have uniform spacing and may be spaced apart by a center-to-center distance 724 (also referred to as inter-antenna element spacing 724). As shown in FIG. 7, the expression aλ may represent the value of the distance 722, where a is a positive number representing the spacing factor for Tx antenna elements in each column and λ represents a wavelength. As further shown in FIG. 7, the expression bλ may represent the value of the distance 724, where b is a positive number representing the spacing factor for Tx antenna elements in each row.

The size of the Tx antenna array may be expressed in terms of the number of antenna elements $N_{T1}$ 714 in each column of the Tx antenna array and the number of antenna elements $N_{T2}$ 716 in each row of the Tx antenna array. Accordingly, the size of the Tx antenna array may be expressed as $N_{T1} \times N_{T2}$. In the example of FIG. 7, since the Tx antenna array includes four Tx antenna elements in each column (e.g., $N_{T1}=4$) and eight Tx antenna elements in each row (e.g., $N_{T2}=8$), the size of the Tx antenna array may be described as a four by eight antenna array including 32 Tx antenna elements (e.g., 4×8=32 Tx antenna elements).

The Rx antenna array includes a set of Rx antenna elements, such as Rx antenna elements 708, 710, 712. In some examples, each of the Rx antenna elements in the Rx antenna array may be approximately equal in size and may have a circular shape, such as the Rx antenna element 712 with diameter 753. The Rx antenna elements in each column (e.g., Rx antenna elements 708, 710) of the Rx antenna array may have uniform spacing and may be spaced apart by a center-to-center distance 726 (also referred to as inter-antenna element spacing 726). The Rx antenna elements in each row (e.g., Rx antenna elements 708, 712) of the Rx antenna array may have uniform spacing and may be spaced apart by a center-to-center distance 728 (also referred to as inter-antenna element spacing 728). As shown in FIG. 7, the expression $c\lambda$ may represent the value of the distance 726, where c is a positive number representing the spacing factor for Rx antenna elements in each column and represents a wavelength. As further shown in FIG. 7, the expression $d\lambda$ may represent the value of the distance 728, where d is a positive number representing the spacing factor for Rx antenna elements in each row.

The size of the Rx antenna array may be expressed in terms of the number of antenna elements $N_{R1}$ 718 in each column of the Rx antenna array and the number of antenna elements $N_{R2}$ 720 in each row of the Rx antenna array. Accordingly, the size of the Rx antenna array may be expressed as $N_{R1} \times N_{R2}$. In the example of FIG. 7, since the Rx antenna array includes four Rx antenna elements in each column (e.g., $N_{R1}=4$) and eight Rx antenna elements in each row (e.g., $N_{R2}=8$), the size of the Rx antenna array may be described as a four by eight antenna array including 32 Rx antenna elements (e.g., 4×8=32 Rx antenna elements).

In the example of FIG. 7, the values of a, b, c, and d may be set to 0.5, such that each of the distances 722, 724, 726, 728 is expressed as $0.5\lambda$. In FIG. 7, the Tx antenna array is offset from the Rx antenna array in the horizontal direction 792 by an offset distance ($\Delta_1$) 730. In the example of FIG. 7, if the distance 724 is set to $0.5\lambda$, then $\Delta_1=(8)0.5=4\lambda$. It should be noted that the Tx antenna array is not offset from the Rx antenna array in the vertical direction 790.

Figure 8:
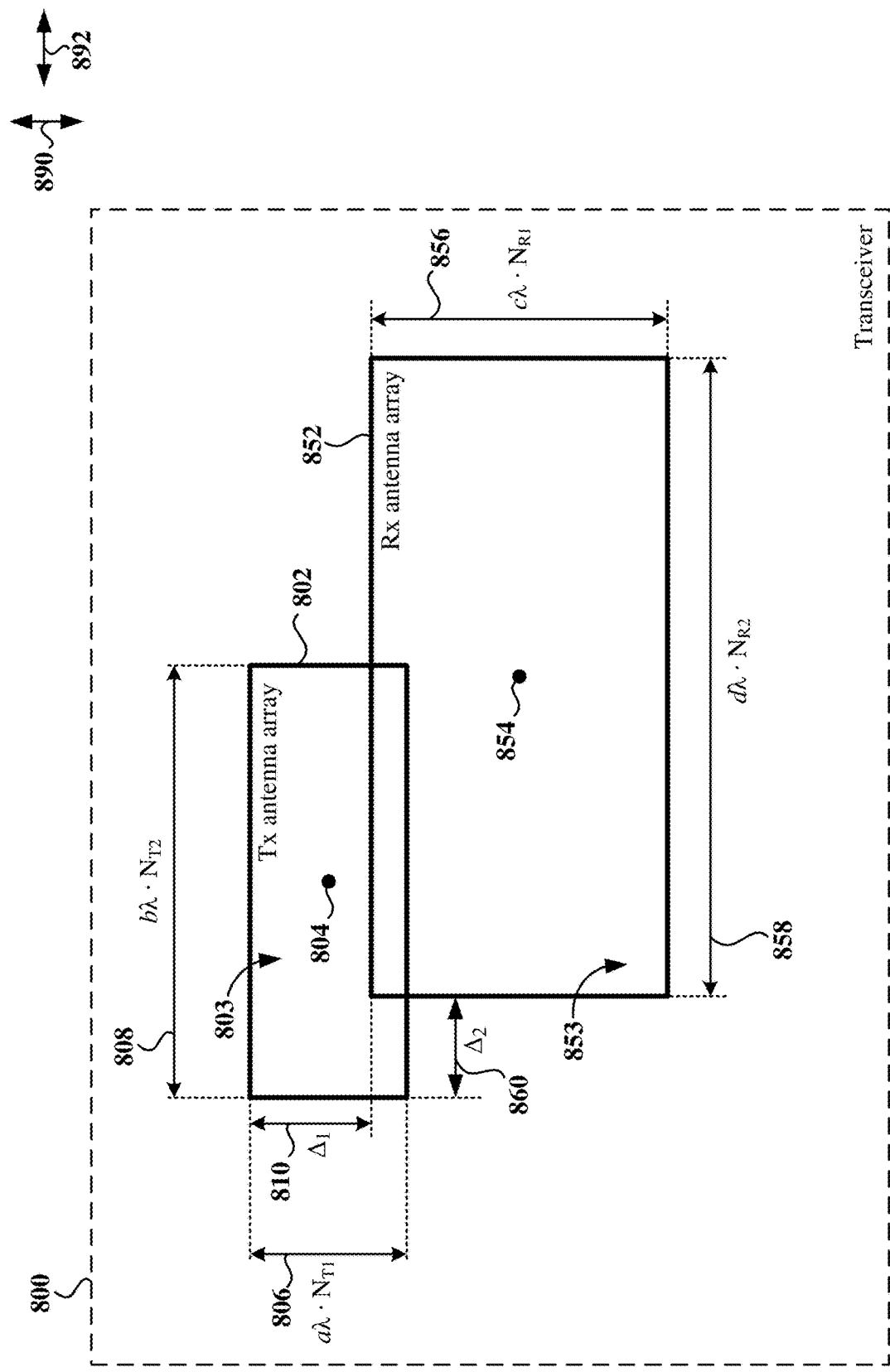
FIG. 8 illustrates a transceiver including a Tx antenna array and an Rx antenna array in accordance with various aspects of the disclosure.

FIG. 8 illustrates a transceiver 800 including a transmit (Tx) antenna array 802 and a receive (Rx) antenna array 852 in accordance with various aspects of the disclosure. The Tx antenna array 802 may include a surface 803 and a number of Tx antenna elements. In one example, the Tx antenna array 802 may be the Tx antenna array 400 previously described with reference to FIG. 4. The Rx antenna array 852 may include a surface 853 and a number of Rx antenna elements. In one example, the Rx antenna array 852 may be the Rx antenna array 450 previously described with reference to FIG. 4.

As shown in FIG. 8, the Tx antenna array 802 may have a height 806 and a width 808. The height 806 may be expressed as $a\lambda \cdot N_{T1}$, where a is a positive number representing the spacing factor for Tx antenna elements in each column, $\lambda$ represents a wavelength, and $N_{T1}$ is the number of Tx antenna elements in each column. The width 808 may be expressed as $b\lambda \cdot N_{T2}$, where b is a positive number representing the spacing factor for Tx antenna elements in each row, $\lambda$ represents a wavelength, and $N_{T2}$ is the number of Tx antenna elements in each row. The center of the Tx antenna array 802 is indicated at the center point 804.

The Rx antenna array 852 may have a height 856 and a width 858. The height 856 may be expressed as $c\lambda \cdot N_{R1}$, where c is a positive number representing the spacing factor for Rx antenna elements in each column, $\lambda$ represents a wavelength, and $N_{R1}$ is the number of Rx antenna elements in each column. The width 858 may be expressed as $d\lambda \cdot N_{R2}$, where d is a positive number representing the spacing factor for Rx antenna elements in each row, $\lambda$ represents a wavelength, and $N_{R2}$ is the number of Rx antenna elements in each row. The center of the Rx antenna array 852 is indicated at the center point 854.

As shown in FIG. 8, the Rx antenna array 852 is offset from the Tx antenna array 802 in the vertical direction 890 by a first offset distance ($\Delta_1$) 810, and the Rx antenna array 852 is offset from the Tx antenna array 802 in the horizontal direction 892 by a second offset distance ($\Delta_2$) 860. In some examples, the first offset distance ($\Delta_1$) 810 may be the vertical distance between a first Tx antenna element in a first row and a first column in the Tx antenna array 802 and a first Rx antenna element in a first row and a first column in the Rx antenna array 852. In some examples, the second offset distance ($\Delta_2$) 860 may be the horizontal distance between the first Tx antenna element in the first row and the first column in the Tx antenna array 802 and the first Rx antenna element in the first row and the first column in the Rx antenna array 852.

Figure 9:
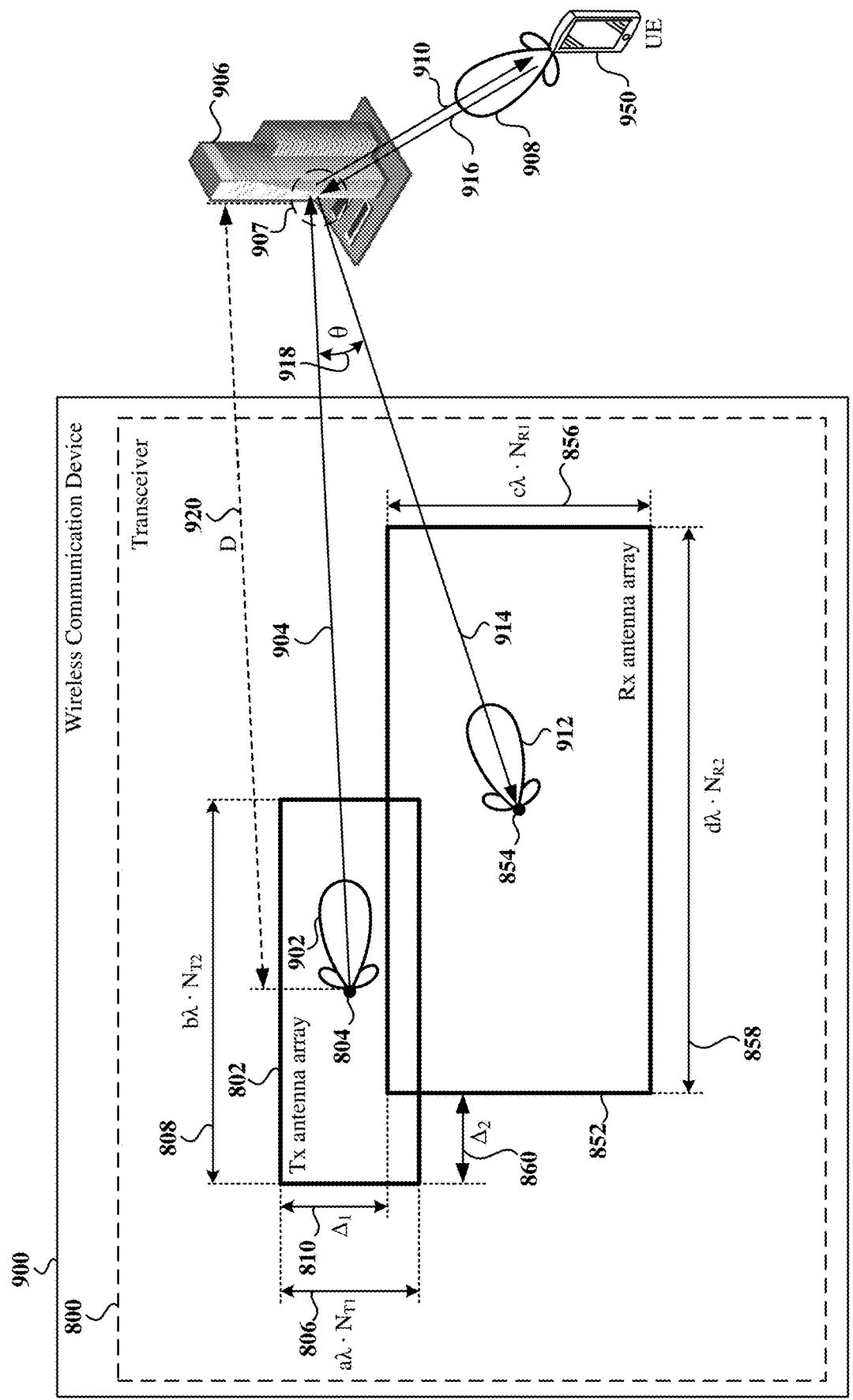
FIG. 9 illustrates a transmit beam formed at the Tx antenna array and a receive beam formed at the Rx antenna array.

FIG. 9 illustrates a transmit beam 902 formed at the Tx antenna array 802 and a receive beam 912 formed at the Rx antenna array 852. In some examples, the transceiver 800 including the Tx antenna array 802 and the Rx antenna array 852 may be implemented in a wireless communication device 900. In some examples, the wireless communication device 900 may be a base station. For example, the wireless communication device 900 may form the transmit beam 902 to transmit downlink (DL) signals to the UE 950, and may form the receive beam 912 to receive uplink (UL) signals from the UE 950.

In the example scenario of FIG. 9, a wireless communication channel between the wireless communication device 900 and the UE 950 may include an object 906. The term wireless communication channel (also more simply referred to as a channel) as used herein may refer to a path over which energy is steered between wireless communication devices. For example, the object 906 may be a structure (e.g., a building), a vehicle, a natural object (e.g., a tree), or any other type of object capable of reflecting, diffracting, or scattering wireless communication signals.

In some scenarios, the object 906 (or a portion of the object 906) may be referred to as a cluster. The term "cluster" as used herein is defined as an object in the wireless communication environment between first and second wireless communication devices which allows steering of energy from one wireless communication device to another. In some examples, a cluster at millimeter wave frequencies may be a reflector (e.g., a glass or metallic object), a diffractor (e.g., a corner of a building or a sharp object) or a diffuse scatterer (e.g., an object having a dimensionality larger than the carrier wavelength allowing a scattering of the transmitted energy in non-distinct directions).

As shown in FIG. 9, the wireless communication device 900 may determine that the cluster 907 in the wireless communication channel provides the best signal strength and may form the transmit beam 902 in a direction toward the cluster 907. In FIG. 9, for example, the direction of the transmit beam 902 toward the cluster 907 is indicated with the signal transmission path 904. The wireless communication device 900 may assume channel reciprocity and may form the receive beam 912 toward the cluster 907. In FIG. 9, for example, the direction of the receive beam 912 toward the cluster 907 is indicated with the signal reception path 914. The UE 950 may form a beam 908 toward the cluster 907 for reception of signal transmissions. The UE 950 may assume channel reciprocity and may use the beam 908 for signal transmissions toward the cluster 907. In FIG. 9, for example, the direction of the beam 908 toward the cluster 907 is indicated with the signal reception path 910 and the signal transmission path 916.

The separation of the Tx antenna array 802 from the Rx antenna array 852 may cause the direction of the transmit beam 902 and the direction of the receive beam 912 to form an angle θ 918 at the cluster 907. In some examples, the angle θ 918 may represent the difference between the direction of the transmit beam 902 and the direction of the receive beam 912. Therefore, larger values of a distance D 920 between the Tx antenna array 802 and the Rx antenna array 852 (e.g., larger distances between the center point 804 of the Tx antenna array 802 and the center point 854 of the Rx antenna array 852) may result in larger values of the angle θ 918.

In some scenarios, the difference (e.g., the angle θ 918) between the direction of the transmit beam 902 and the direction of the receive beam 912 may increase to a point where beam correspondence may no longer be achieved. In other words, a beam correspondence failure may occur at the wireless communication device 900. Therefore, in these scenarios, the wireless communication device 900 may no longer assume channel reciprocity and may need to decouple the direction of the transmit beam 902 from the direction of the receive beam 912. As a result, the wireless communication device 900 may need to steer the directions of the transmit and receive beams 902, 912 independently in different directions.

Beam correspondence failures may occur dynamically and may depend on one or more factors. In some examples, an occurrence of a beam correspondence failure may depend on a size of a transmit antenna array or a receive antenna array implemented by a wireless communication device, a spacing between antenna elements in the transmit antenna array or the receive antenna array, a distance from the transmit antenna array or receive antenna array to a cluster or reflector in the wireless communication channel, a beamwidth of a transmit beam (e.g., formed at the transmit antenna array) in elevation and azimuth, and/or a beamwidth of a receive beam (e.g., formed at the receive antenna array) in elevation and azimuth.

In some examples, a beam correspondence failure may occur dynamically at a wireless communication device when switching between antenna arrays of different sizes (e.g., when operating at frequency bands within FR4 or greater). In some examples, the spacing between antenna elements in a transmit antenna array or the spacing between antenna elements in a transmit antenna array may be a center-to-center distance that is within the range 0.3λ to 0.8λ, where λ represents a wavelength.

In some examples, the distance from the transmit antenna array or receive antenna array to a cluster or reflector in the wireless communication channel may change dynamically due to changes in the channel environment. For example, an automobile may be acting as a cluster or reflector in the wireless communication channel and the distance from the transmit antenna array or receive antenna array to the automobile may change as the automobile moves. In some examples, the beamwidth of the transmit beam and/or the beamwidth of the receive beam may change dynamically based on the set of beam weights applied at the transmit antenna array or the receive antenna array.

When a beam correspondence failure occurs at a wireless communication device, the wireless communication device may need to perform a beam training procedure for the transmit beam and/or a beam training procedure for the receive beam.

Figure 10:
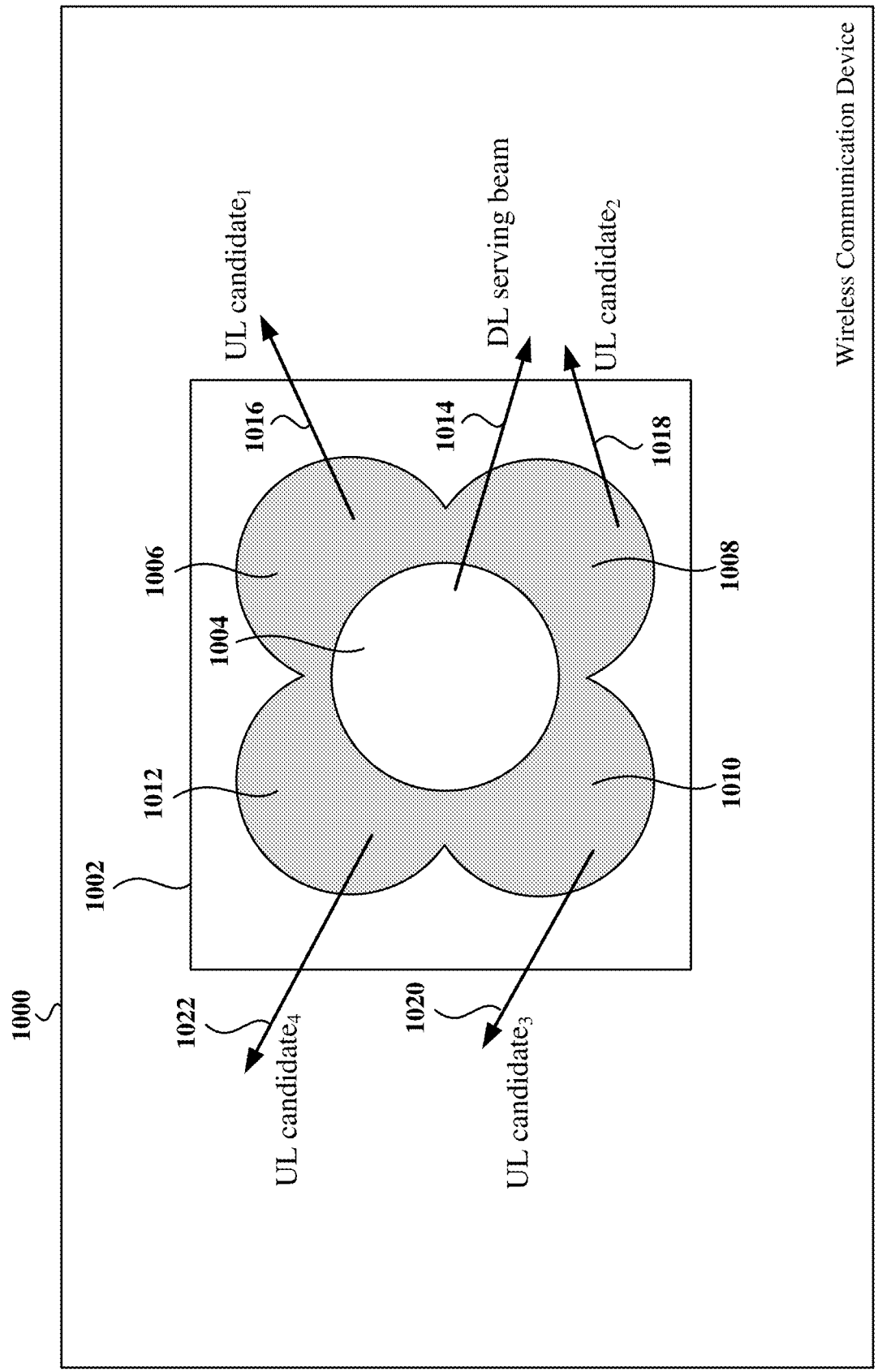
FIG. 10 illustrates a top view of an antenna array in a wireless communication device.

FIG. 10 illustrates a top view of an antenna array 1002 in a wireless communication device 1000. The antenna array 1002 may include a Tx antenna array and an Rx antenna array. With reference to FIG. 10, the wireless communication device 1000 may perform separate beam training procedures to determine different transmit and receive beams at the antenna array 1002. For example, the wireless communication device 1000 may form a group of transmit beams 1004 and may select the best transmit beam 1014 as the downlink (DL) serving beam (e.g., for transmitting downlink signals to a second wireless communication device, such as a UE) based on beam strength. The wireless communication device 1000 may proceed to form groups of receive beams, such as a first group of receive beams 1006, a second group of receive beams 1008, a third group of receive beams 1010, and a fourth group of receive beams 1012.

The wireless communication device 1000 may select a set of receive beams 1016, 1018, 1020, 1022 closest to the DL serving beam 1014 from the groups of receive beams 1006, 1008, 1010, 1012, where the set of receive beams 1016, 1018, 1020, 1022 serve as uplink (UL) candidate beams. The wireless communication device 1000 may determine a best receive beam from the set of receive beams 1016, 1018, 1020, 1022 based on beam strength (e.g., an RSRP measurement) and may select the best receive beam as the receive beam for reception of UL signals from the second wireless communication device.

Since beam correspondence failures may occur dynamically at the wireless communication device 1000, the wireless communication device 1000 may not be aware as to when beam correspondence exists or has failed at any given time. Therefore, in some scenarios, the wireless communication device 1000 may be using a transmit beam as a receive beam when beam correspondence no longer exists and may experience a loss in performance. In other scenarios, the wireless communication device 1000 may need to perform a receive beam training procedure every time a transmit beam is changed or switched. This may introduce a significant overhead in the network in situations where transmit beams are frequently changed or switched.

Figure 11:
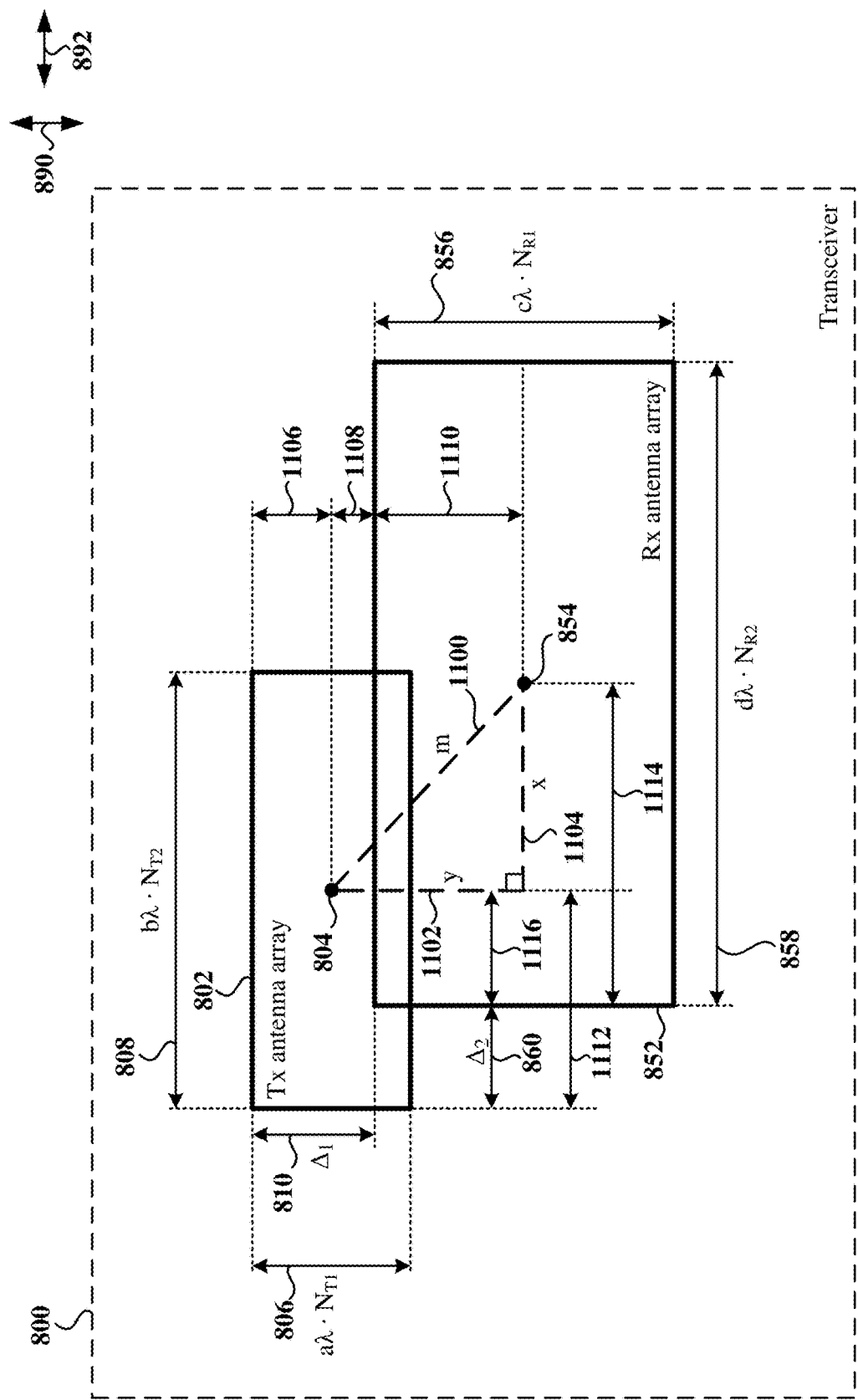
FIG. 11 illustrates the Tx and Rx antenna arrays and a distance between the center of the Tx antenna array and the center of the Rx antenna array.

FIG. 11 illustrates the Tx and Rx antenna arrays 802, 852 and a distance m between the center of the Tx antenna array 802 (e.g., at center point 804) and the center of the Rx antenna array 852 (e.g., at center point 854). As shown in FIG. 11, the distance m may be determined by forming a right triangle including sides 1102, 1104, and 1100 and solving for the length of the side 1100 (e.g., using the Pythagorean theorem). For example, the side 1102 may have a length y, which may be determined using the following equation (1):

$$y \approx \left| \Delta_1 - \frac{a\lambda \cdot N_{T_1}}{2} + \frac{c\lambda \cdot N_{R_1}}{2} \right| \quad (1)$$

where y represents the length of side 1102, $\Delta_1$ represents the first offset distance 810, a is a positive number representing the spacing factor for Tx antenna elements in each column of the Tx antenna array 802, $\lambda$ represents a wavelength, $N_{T1}$ represents the number of Tx antenna elements in each column of the Tx antenna array 802, c is a positive number representing the spacing factor for Rx antenna elements in each column of the Rx antenna array 852, and $N_{R1}$ represents the number of Rx antenna elements in each column of the Rx antenna array 852.

For example, with reference to FIG. 11, the expression $(a\lambda \cdot_{T1})/2$ in equation (1) may represent the length 1106, the expression $(c\lambda \cdot N_{R1})/2$ may represent the length 1110, and the difference between $\Delta_1$ and the expression $(a\lambda \cdot_{T1})/2$ may represent the length 1108. It should be noted that the sum of the lengths 1108 and 1110 is approximately equal to the length y.

For example, side 1104 may have a length x, which may be determined using the following equation (2):

$$x \approx \left| \Delta_2 - \frac{b\lambda \cdot N_{T_2}}{2} + \frac{d\lambda \cdot N_{R_2}}{2} \right| \quad (2)$$

where x represents the length of side 1104, $\Delta_2$ represents the second offset distance 860, b is a positive number representing the spacing factor for Tx antenna elements in each row, $\lambda$ represents a wavelength, $N_{T2}$ represents the number of antenna elements in each row of the Tx antenna array 802, d is a positive number representing the spacing factor for Rx antenna elements in each row of the Rx antenna array 852, and $N_{R2}$ represents the number of antenna elements in each row of the Rx antenna array 852.

For example, with reference to FIG. 11, the expression $(b\lambda \cdot N_{T2})/2$ in equation (2) may represent the length 1112, the expression $(d\lambda \cdot N_{R2})/2$ may represent the length 1114, and the difference between $\Delta_2$ and the expression $(b\lambda \cdot N_{T2})/2$ may represent the length 1116. It should be noted that the difference between the lengths 1114 and 1116 is approximately equal to the length x.

Therefore, the length of the side 1100 (e.g., the distance m) may be determined using the following equation (3):

$$m = \sqrt{x^2 + y^2} \quad (3)$$

where y represents the length of side 1102 as determined using equation (1), and x represents the length of side 1104 as determined using equation (2). Therefore, the distance between the points 804 and 854 may be approximately equal to the value of m as determined using equation (3).

Figure 12:
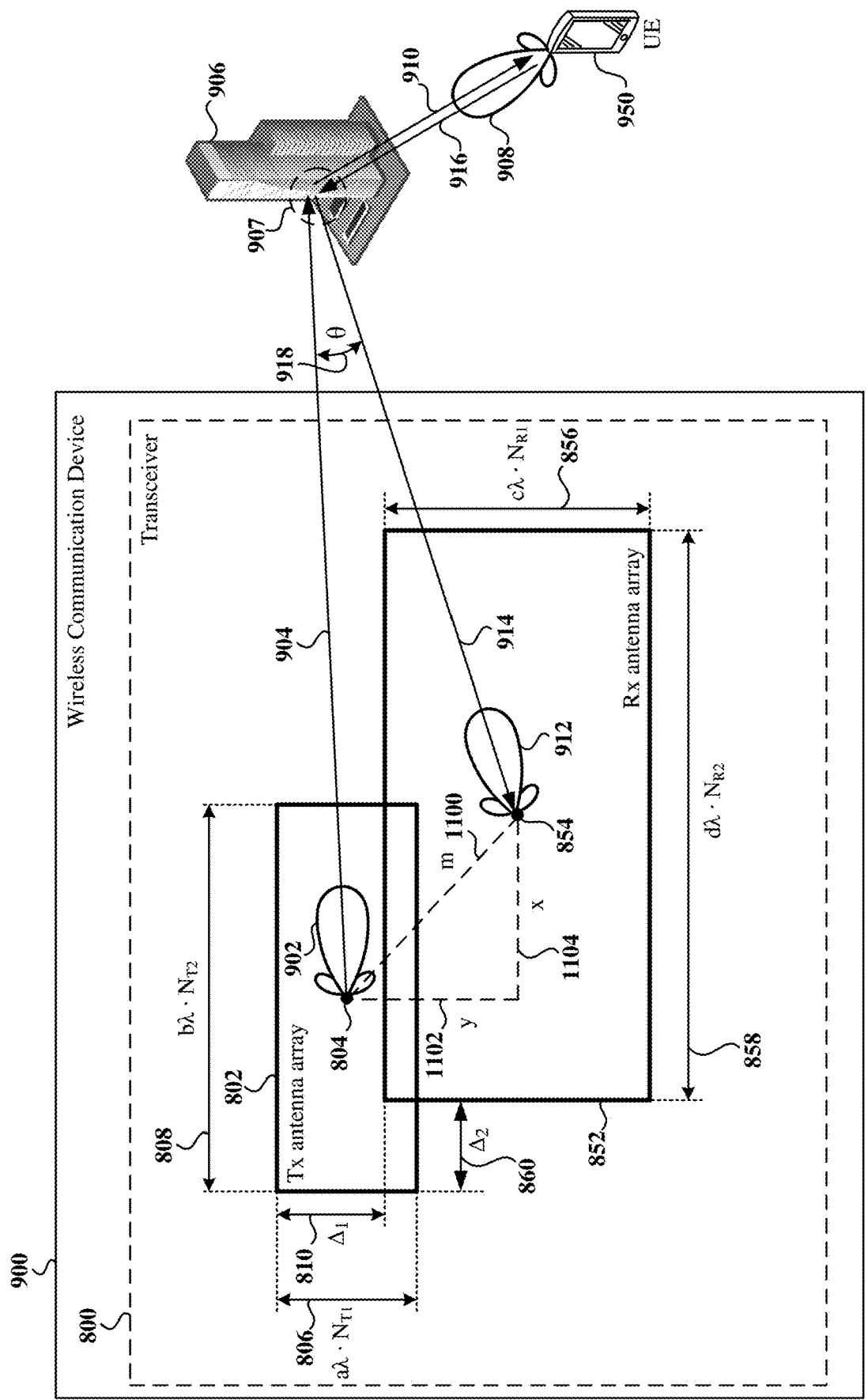
FIG. 12 illustrates a wireless communication device configured to monitor the difference between the first direction of the transmit beam formed at the Tx antenna array and the second direction of the receive beam formed at the Rx antenna array 852.

FIG. 12 illustrates a wireless communication device configured to monitor the difference between the first direction of the transmit beam 902 formed at the Tx antenna array 802 and the second direction of the receive beam 912 formed at the Rx antenna array 852. As shown in FIG. 12, the direction of the transmit beam 902 toward the cluster 907 is indicated with the signal transmission path 904, and the direction of the receive beam 912 toward the cluster 907 is indicated with the signal transmission path 914. Due to the separation of the Tx and Rx antenna arrays 802, 852, the direction of the transmit beam 902 may be different from the direction of the receive beam 912. The difference between the directions of the transmit and receive beams 902, 912 may be represented by the angle $\theta$ 918.

In some examples, the wireless communication device 900 may determine the value of the angle $\theta$ 918 based on a size of the Tx antenna array 802 (e.g., $N_{T1} \times N_{T2}$), a size of the Rx antenna array 852 (e.g., $N_{R1} \times N_{R2}$), the geometry (e.g., shape) of the Tx antenna array 802, the geometry (e.g., shape) of the Rx antenna array 852, an arrangement of transmit antenna elements (e.g., rows, columns) in the Tx antenna array 802, an arrangement of receive antenna elements (e.g., rows, columns) in the Rx antenna array 852, a set of beam weights associated with the transmit beam 902, a set of beam weights associated with the receive beam 912, a distance between the Tx antenna array 802 and the Rx antenna array 852 (e.g., the distance m between the center of the Tx antenna array 802 (e.g., at center point 804) and the center of the Rx antenna array 852 (e.g., at center point 854)), and/or a distance from the Tx antenna array 802 or the Rx antenna array 852 to a cluster (e.g., the cluster 907) or a reflector (e.g., the object 906) in a channel over which energy is steered between the wireless communication device 900 and another wireless communication device (e.g., the UE 950).

In some aspects of the disclosure, the wireless communication device 900 may determine the difference between the directions of the transmit and receive beams 902, 912 (e.g., the angle $\theta$ 918) using equation (4):

$$\theta \approx \frac{180}{\pi} \cdot \frac{m}{D} \quad (4)$$

where $\theta$ (e.g., the angle $\theta$ 918) represents the difference between the direction of the transmit beam 902 and the direction of the receive beam 912, m represents the center-to-center distance between the Tx and Rx antenna arrays 802, 852, D represents the distance from the Tx antenna array 802 or the Rx antenna array 852 to a cluster (e.g., cluster 907) or reflector (e.g., object 906) in the wireless communication channel, and $180/\pi$ is a conversion factor for converting radians to degrees. In some examples, the value of D may be sufficiently large so that far field conditions hold.

It should be noted that the distance m, the distance from the Tx antenna array 802 to the cluster 907 (e.g., the distance from the center point 804 to the cluster 907), and the distance from the Rx antenna array 852 to the cluster 907 (e.g., the distance from the center point 854 to the cluster 907) form a triangle where the angle $\theta$ 918 is opposite to the distance m. Therefore, the wireless communication device 900 may apply equation (4) to determine the angle $\theta$ 918 of this triangle.

Since the distance m may be expressed as $\sqrt{x^2+y^2}$ as described with reference to equation (3), equation (4) may be rewritten to replace m with the expression $\sqrt{x^2+y^2}$ as shown in the following equation (5):

$$\theta \approx \frac{180}{\pi} \cdot \frac{\sqrt{x^2+y^2}}{D} \quad (5)$$

where y represents the length of side 1102 as determined using equation (1), and x represents the length of side 1104 as determined using equation (2).

In some scenarios, if the wireless communication device 900 has a line of sight (LOS) to a different wireless communication device (e.g., a UE, CPE), the distance from the Tx antenna array 802 or the Rx antenna array 852 to the cluster or reflector in the wireless communication channel may be the distance from the Tx antenna array 802 or the Rx antenna array 852 to the different wireless communication device. In these scenarios, the wireless communication device 900 may estimate the distance from the Tx antenna array 802 or the Rx antenna array 852 to the different wireless communication device (e.g., the UE 950).

In some examples, the wireless communication device 900 may estimate the distance from the wireless communication device 900 to the different wireless communication device (e.g., the UE 950) based on a location of the different wireless communication device. For example, the wireless communication device 900 may determine the location of the different wireless communication device (e.g., the UE 950) based on a positioning algorithm that indicates the location of the different wireless communication device (e.g., the UE 950).

In some examples, the wireless communication device 900 may receive one or more path loss estimates from the different wireless communication device (e.g., UE 950). The wireless communication device 900 may estimate the distance from the wireless communication device 900 to the different wireless communication device (e.g., the UE 950) based on the one or more path loss estimates.

In some scenarios, if the wireless communication device 900 does not have a line of sight (LOS) to a different wireless communication device (e.g., a UE, CPE), the distance from the Tx antenna array 802 or the Rx antenna array 852 to the cluster or reflector in the wireless communication channel may be different from the distance from the Tx antenna array 802 or the Rx antenna array 852 to the different wireless communication device (e.g., a UE, CPE). In these scenarios, the wireless communication device 900 may determine the distance from the Tx antenna array 802 or the Rx antenna array 852 to the cluster or reflector in the wireless communication channel based on a location of an object (e.g., the object 906) capable of reflecting, diffracting or scattering wireless communication signals.

In some examples, the wireless communication device 900 may determine the distance to the cluster or reflector based on the location of the wireless communication device 900 and information about the static environment around the wireless communication device 900 (e.g., installation information indicating locations of buildings, fixtures, or other structures). In some examples, the wireless communication device 900 may use path loss estimates from the different wireless communication device (e.g., a UE, CPE) in combination with the location of the wireless communication device 900 and information about the static environment around the wireless communication device 900 to determine the distance between the wireless communication device 900 and the cluster or reflector In some examples, the wireless communication device 900 may determine the distance from the Tx antenna array 802 or the Rx antenna array 852 to the cluster or reflector in the wireless communication channel based on one or more path loss estimates and/or other information received from the different wireless communication device (e.g., a UE, CPE). For example, the wireless communication device 900 may receive one or more path loss estimates from the different wireless communication device (e.g., the UE 950) and/or information indicating a location of an object (e.g., the object 906) capable of reflecting, diffracting, or scattering wireless communication signals. The wireless communication device 900 may determine the distance from the transmit antenna array 802 or the receive antenna array 852 to the cluster or reflector based on the one or more path loss estimates and/or the location of the object capable of reflecting or diffracting or scattering wireless communication signals.

In indoor settings, the wireless communication device 900 may use ray tracing and map-based information, which may indicate the location of potential dominant clusters or reflectors in the wireless communication channel. For example, the wireless communication device 900 may determine the location of potential dominant clusters or reflectors through which a directional link has been established (e.g., glass, metallic object, etc.) in the wireless communication channel using ray tracing and the map-based information. The wireless communication device 900 may use the location of a potential dominant cluster or reflector to determine the distance from the transmit antenna array 802 or the receive antenna array 852 to the dominant cluster or reflector.

In some examples, the wireless communication device 900 may provide additional signaling to the different wireless communication device (e.g., UE 950) to determine the cluster or reflector.

In some examples, if the different wireless communication device (e.g., UE 950) has the ability to obtain information indicating the distance to the cluster or reflector and/or the location of the cluster or reflector, the different wireless communication device (e.g., UE 950) may report this information to the wireless communication device 900. In some examples, the wireless communication device 900 may combine the reported information indicating the distance to the cluster or reflector with one or more path loss estimates from the different wireless communication device (e.g., UE 950) to determine the distance between the transmit antenna array 802 or the receive antenna array 852 to the cluster or reflector. In some examples, the information may include sensor data, such as radar data, light detection and ranging (LIDAR) data, etc.

Determination of a Beam Correspondence Failure

The wireless communication device 900 may determine that a beam correspondence failure has occurred when the difference between the directions of the transmit and receive beams 902, 912 (e.g., the angle θ 918) is greater than or equal to a beam correspondence threshold. In some aspects of the disclosure, the beam correspondence threshold may be a value (e.g., an angle in degrees) based on a beamwidth of the transmit beam 902 or a beamwidth of the receive beam 912.

Figure 13:
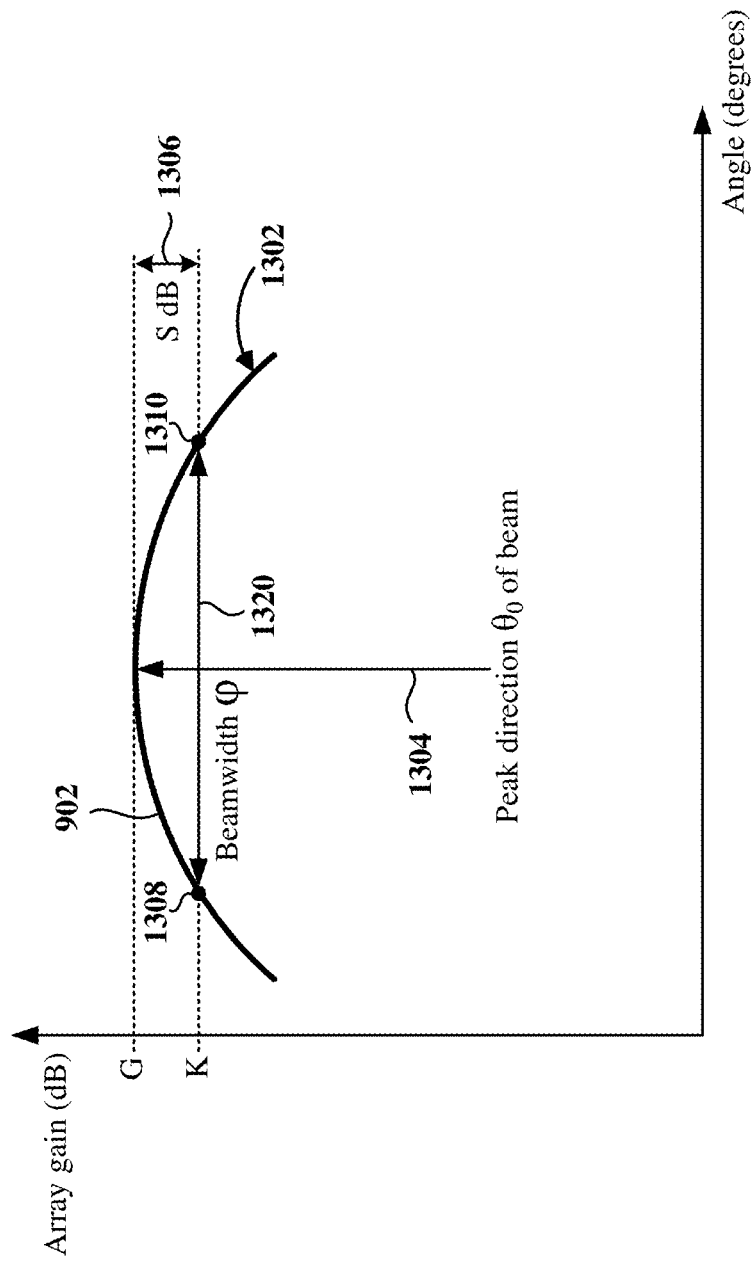
FIG. 13 illustrates the gain of the Tx antenna array with respect to the direction of the transmit beam.

For example, FIG. 13 illustrates the gain of the Tx antenna array 802 with respect to the direction (e.g., angle) of the transmit beam 902. As shown in the example of FIG. 13, the Tx antenna array 802 steers the transmit beam 902 towards a peak direction $\theta_0$ to achieve a peak gain value G. In some examples, the peak gain value G may represent a number in units of decibels (dB). In FIG. 13, the curve 1302 represents the shape (e.g., beam pattern) of the transmit beam 902, and the arrow 1304 indicates the peak direction $\theta_0$.

In some examples, the beam correspondence threshold may be a beamwidth φ 1320. For example, the beamwidth φ 1320 may represent an angle in units of degrees. In some aspects of the disclosure, and as described in detail below, the wireless communication device 900 may determine the beam correspondence threshold (e.g., the beamwidth φ 1320) based on a threshold gain value K. In some examples, the threshold gain value K may represent a number in units of decibels (dB).

In some aspects of the disclosure, the wireless communication device 900 may determine the threshold gain value K based on the peak gain value G and a threshold gain control value S (e.g., the threshold gain control value S 1306 in FIG. 13). The threshold gain control value S may represent a number in units of decibels (dB). In some examples, the wireless communication device 900 may use the threshold gain control value S to determine an acceptable lower bound array gain (e.g., threshold gain value K) with respect to the peak gain value G. In some examples, the wireless communication device 900 may set the threshold gain control value S to 3 dB. In other examples, the wireless communication device 900 may set the threshold gain control value S to a value less than 3 dB or greater than 3 dB. In some aspects of the disclosure, the wireless communication device 900 may configure the threshold gain control value S in coordination with a different wireless communication device (e.g., UE 950, a CPE) in the network.

In some examples, to determine the beam correspondence threshold (e.g., the beamwidth φ 1320), the wireless communication device 900 may first determine the threshold gain value K. For example, the wireless communication device 900 may determine the threshold gain value K by determining the difference between the peak gain value G and the threshold gain control value S (e.g., K=G−S). The wireless communication device 900 may locate the points where the beam pattern (e.g., the curve 1302) of the transmit beam 902 intersects the threshold gain value K (e.g., at points 1308, 1310). The beamwidth φ 1320 may be defined between these points (e.g., the points 1308, 1310).

It should be noted that the threshold gain value K may represent an acceptable lower bound array gain for the Tx antenna array 802 for purposes of determining beam correspondence. For example, in one scenario, if the direction of the transmit beam 902 drifts away from the peak direction $\theta_0$ indicated with the arrow 1304, and the gain of the Tx antenna array 802 consequently drops to a value between the peak gain value G and the threshold gain value K, the wireless communication device 900 may determine that the gain of the Tx antenna array 802 is acceptable for beam correspondence. In another scenario, if the gain of the Tx antenna array 802 drops below the threshold gain value K, the wireless communication device 900 may determine that the gain of the Tx antenna array 802 is not acceptable for beam correspondence.

It should further be noted that the size of the threshold gain control value S may control the range of acceptable gain values for the Tx antenna array 802 with respect to the peak gain value G for purposes of determining beam correspondence. In one example, if the threshold gain control value S is set to 3 dB, a gain of the Tx antenna array 802 falling between G and G−3 dB (e.g., K=G−3 dB) may be acceptable for purposes of determining beam correspondence. In another example, if the threshold gain control value S is set to 6 dB, a gain of the Tx antenna array 802 falling between G and G−6 dB (e.g., K=G−6 dB) may be acceptable for purposes of determining beam correspondence.

Referring back to FIG. 12, the wireless communication device 900 may compare the difference (e.g., the angle θ 918) between the direction of the transmit beam 902 and the direction of the receive beam 912 to a beam correspondence threshold. As previously described, the beam correspondence threshold may be the beamwidth φ (e.g., the beamwidth φ 1320) corresponding to the signal strength threshold (e.g., the threshold gain value K). If the difference (e.g., the angle θ 918) between the direction of the transmit beam 902 and the direction of the receive beam 912 is greater than or equal to the beam correspondence threshold (e.g., if θ≥φ), the wireless communication device 900 may determine that a beam correspondence failure has occurred.

In some aspects of the disclosure, the wireless communication device 900 may periodically determine the difference (e.g., the angle θ 918) between the direction of the transmit beam 902 and the direction of the receive beam 912 and may compare the difference to the beam correspondence threshold to enable dynamic detection of any beam correspondence failures.

For example, if the difference (e.g., the angle θ 918) between the direction of the transmit beam 902 and the direction of the receive beam 912 is greater than or equal to the beam correspondence threshold (e.g., if θ≥φ), the wireless communication device 900 may determine that the gain of the receive beam 912 is at least S dB greater than the gain of the transmit beam 902. This is expressed in the following condition (6):

$$|\text{Gain}_{UL} - \text{Gain}_{DL}| \geq S \quad (6)$$

where the term $\text{Gain}_{UL}$ represents the gain of the receive beam 912, the term $\text{Gain}_{DL}$ represents the gain of the transmit beam 902, and S represents the threshold gain control value S (e.g., the threshold gain control value S 1306 in FIG. 13). In some examples, the terms $\text{Gain}_{UL}$, $\text{Gain}_{DL}$, and S may be in units of decibels (dB). The wireless communication device 900 may consider the previously described condition (6) as providing an unacceptable level of beam correspondence and may determine that a beam correspondence failure has occurred.

If the difference (e.g., the angle θ 918) between the direction of the transmit beam 902 and the direction of the receive beam 912 is less than the beam correspondence threshold (e.g., if θ<φ), the wireless communication device 900 may determine that a beam correspondence failure has not occurred. For example, if the difference (e.g., the angle θ 918) between the direction of the transmit beam 902 and the direction of the receive beam 912 is less than the beam correspondence threshold (e.g., if θ<φ), the wireless communication device 900 may determine that the receive beam 912 has a gain that is within S dB of the transmit beam 902. This is expressed in the following condition (7):

$$|\text{Gain}_{UL} - \text{Gain}_{DL}| < S \quad (7)$$

where the terms the terms $\text{Gain}_{UL}$, $\text{Gain}_{DL}$, and S have been previously described with reference to condition (6). The wireless communication device 900 may consider the previously described condition (7) as providing an acceptable level of beam correspondence. Therefore, if the difference (e.g., the angle θ 918) between the direction of the transmit beam 902 and the direction of the receive beam 912 is less than the beam correspondence threshold (e.g., if θ<φ), the wireless communication device 900 may determine that a beam correspondence failure has not occurred.

In some aspects of the disclosure, the wireless communication device 900 may transmit an indication of a beam correspondence failure to the UE 950 when the difference (e.g., the angle θ 918) between the direction of the transmit beam 902 and the direction of the receive beam 912 is greater than or equal to the beam correspondence threshold. In some examples, the wireless communication device 900 may transmit a message to the UE 950 including a bit field for indicating a beam correspondence failure. For example, the wireless communication device 900 may set a bit in the bit field to a first value (e.g., '1') if a beam correspondence failure has occurred, or may set the bit to a second value (e.g., '0') if a beam correspondence failure has not occurred.

In some scenarios, the wireless communication device 900 may not be able to accurately determine the distance to the cluster or reflector in the wireless communication channel. In these scenarios, the wireless communication device 900 may determine whether a beam correspondence failure has occurred based on an estimate of the distance (also referred to as $D_{est}$) to the cluster or reflector in the wireless communication channel. In some examples, the estimate of the distance ($D_{est}$) may be a coarse estimate (e.g., within a range of ±25%) of the actual distance between the wireless communication device 900 and the cluster (e.g., the cluster 907) or reflector (e.g., the object 906).

For example, the wireless communication device 900 may estimate the distance from the transmit antenna array 802 or the receive antenna array 852 to a cluster or reflector in the wireless communication channel and may compare the estimated distance ($D_{est}$) to a distance threshold (also referred to as $D_{threshold}$). For example, the distance threshold ($D_{threshold}$) may be a number in units of meters.

If the estimated distance is less than or equal to the distance threshold ($D_{threshold}$) (e.g., if $D_{est} \leq D_{threshold}$), the wireless communication device 900 may determine that a beam correspondence failure has occurred. In some aspects of the disclosure, the wireless communication device 900 may determine that a beam correspondence failure has occurred upon detection of the condition $D_{est} \leq D_{threshold}$ and/or the condition $\theta \geq \varphi$. In some examples, the wireless communication device 900 may transmit an indication of a beam correspondence failure to a wireless communication device (e.g., the UE 950) when the estimated distance ($D_{est}$) is less than or equal to the distance threshold ($D_{threshold}$). In some examples, the wireless communication device 900 may transmit a message to the UE 950 including a bit field for indicating a beam correspondence failure as described herein. Therefore, if the wireless communication device 900 determines that the estimated distance ($D_{est}$) is too short (e.g., $D_{est} \leq D_{threshold}$), the wireless communication device 900 may infer that beam correspondence between the transmit beam 902 and the receive beam 912 cannot be achieved and may prepare for a beam refinement operation (e.g., an event triggered beam refinement operation) with respect to the UE 950.

In some examples, the wireless communication device 900 may determine the value of the distance threshold ($D_{threshold}$) based on the previously described signal strength threshold (e.g., the threshold gain value K), a beamwidth of the transmit beam 902 or the receive beam 912, a size of the Tx antenna array 802 (e.g., $N_{T1} \times N_{T2}$), a size of the Rx antenna array 852 (e.g., $N_{R1} \times N_{R2}$), a spacing of transmit antenna elements in the Tx antenna array 802, a spacing of receive antenna elements in the Rx antenna array 852, and/or a beamwidth factor $\gamma$. The beamwidth of the transmit beam 902 or the receive beam 912 used for determination of the distance threshold ($D_{threshold}$) may be set based on the previously described signal strength threshold (e.g., the threshold gain value K).

Figure 14:
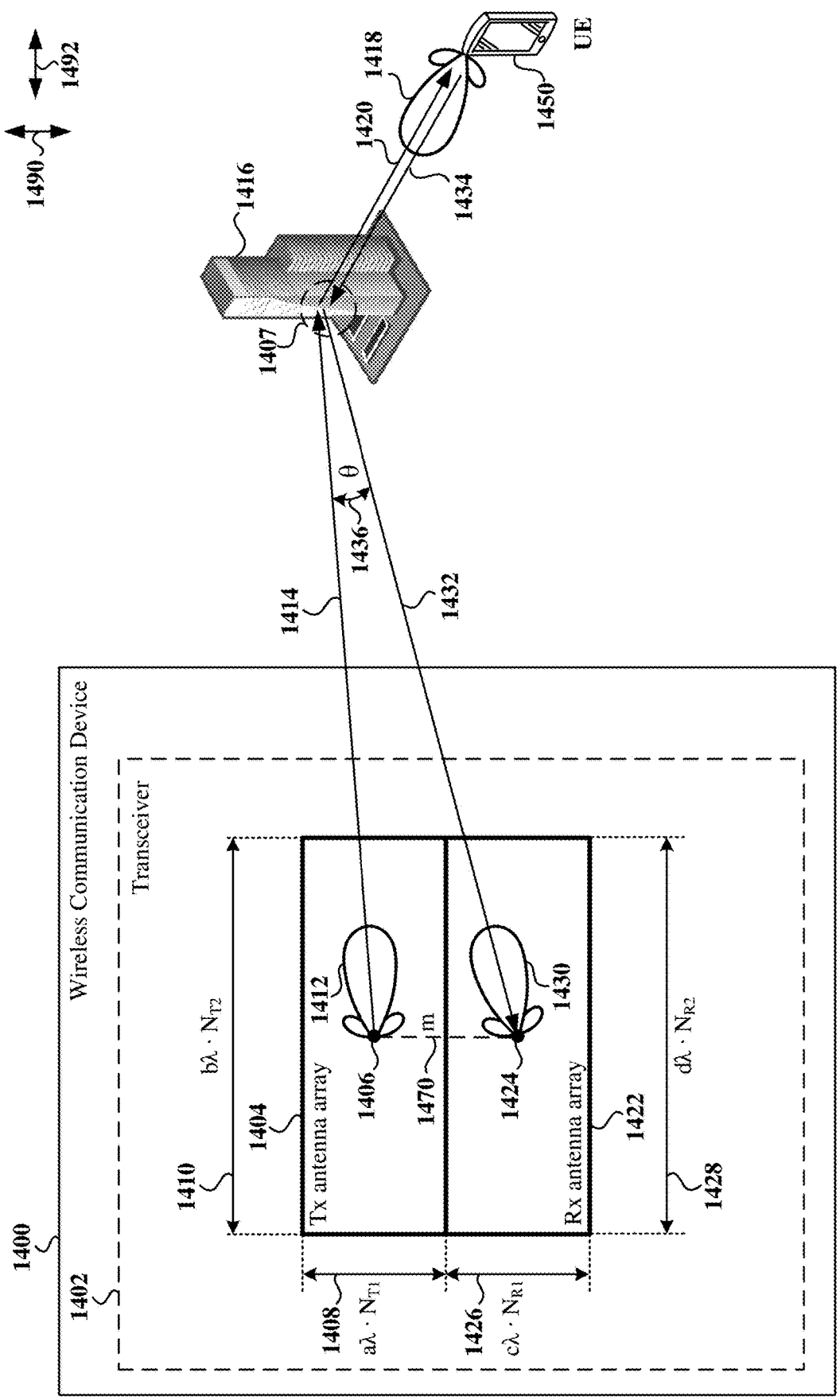
FIG. 14 illustrates a wireless communication device including a transceiver in accordance with various aspects of the disclosure.

FIG. 14 illustrates a wireless communication device 1400 including a transceiver 1402 in accordance with various aspects of the disclosure. In some examples, the wireless communication device 1400 may be a base station. The transceiver 1402 includes a transmit (Tx) antenna array 1404 and a receive (Rx) antenna array 1422 in accordance with various aspects of the disclosure. The Tx antenna array 1404 may include a number of Tx antenna elements. In one example, the Tx antenna array 1404 may be the Tx antenna array 400 previously described with reference to FIG. 4. The Rx antenna array 1422 may include a number of Rx antenna elements. In one example, the Rx antenna array 1422 may be the Rx antenna array 450 previously described with reference to FIG. 4.

The Tx antenna array 1404 may have a height 1408 and a width 1410. The height 1408 may be expressed as $a\lambda \cdot N_{T1}$, where a is a positive number representing the spacing factor for Tx antenna elements in each column, $\lambda$ represents a wavelength, and $N_{T1}$ is the number of antenna elements in each column. The width 1410 may be expressed as $b\lambda \cdot N_{T2}$, where b is a positive number representing the spacing factor for Tx antenna elements in each row and $N_{T2}$ is the number of Tx antenna elements in each row. The center of the Tx antenna array 1404 is indicated at the center point 1406.

The Rx antenna array 1422 may have a height 1426 and a width 1428. The height 1426 may be expressed as $c\lambda \cdot N_{R1}$, where c is a positive number representing the spacing factor for Rx antenna elements in each column, $\lambda$ represents a wavelength, and $N_{R1}$ is the number of Rx antenna elements in each column. The width 1428 may be expressed as $d\lambda \cdot N_{R2}$, where d is a positive number representing the spacing factor for Rx antenna elements in each row and $N_{R2}$ is the number of Rx antenna elements in each row. The center of the Rx antenna array 1422 is indicated at the center point 1424.

In the example configuration of the transceiver 1402 shown in FIG. 14, the Tx antenna array 1404 is situated adjacent to the Rx antenna array 1422 in the vertical direction 1490. The distance m 1470 represents the distance between the center point 1406 of the Tx antenna array 1404 and the center point 1424 of the Rx antenna array 1422.

FIG. 14 illustrates a transmit beam 1412 formed at the Tx antenna array 1404 and a receive beam 1430 formed at the Rx antenna array 1422. For example, the wireless communication device 1400 may form the transmit beam 1412 to transmit downlink (DL) signals to the UE 1450, and may form the receive beam 1430 to receive uplink (UL) signals from the UE 1450.

The wireless communication device 1400 may determine that the cluster 1407 (e.g., at the object 1416) in the wireless communication channel provides the best signal strength and may form the transmit beam 1412 in a direction toward the cluster 1407. In some examples, the object 1416 may be the same as the object 906 described with reference to FIG. 9.

In FIG. 14, for example, the direction of the transmit beam 1412 toward the cluster 1407 is indicated with the signal transmission path 1414. The wireless communication device 1400 may assume channel reciprocity and may form the receive beam 1430 toward the cluster 1407. In FIG. 14, for example, the direction of the receive beam 1430 toward the cluster 1407 is indicated with the signal reception path 1432. The UE 1450 may form a beam 1418 toward the cluster 1407 for reception of signal transmissions. The UE 1450 may assume channel reciprocity and may use the beam 1418 for signal transmissions toward the cluster 1407. In FIG. 14, for example, the direction of the beam 1418 toward the cluster 1407 is indicated with the signal reception path 1420 and the signal transmission path 1434.

The separation of the Tx antenna array 1404 from the Rx antenna array 1422 may cause the direction of the transmit beam 1412 and the direction of the receive beam 1430 to form an angle $\theta$ 1436 at the cluster 1407. In some examples, the angle $\theta$ 1436 may represent the difference between the direction of the transmit beam 1412 and the direction of the receive beam 1430.

In one example, the Tx antenna array 1404 may be the same size as the Rx antenna array 1422 and may have the same inter-antenna element spacing. Therefore, $N_{T1}$ may be equal to $N_{R1}$, $N_{T2}$ may be equal to $N_{R2}$, a may be equal to c, and b may be equal to d. In this example, the wireless communication device 1400 may form the transmit beam 1412 and the receive beam 1430 based on code-book based discrete Fourier transform (DFT) beams with progressive phase shifts. If the wireless communication device 1400 sets the threshold gain control value S to 3 dB, the beamwidth φ (also referred to as a 3 dB beamwidth) may be expressed as 100/N (or as γ·100/N when the beamwidth factor γ is applied), where N represents the antenna dimension of the Tx antenna array 1404 (e.g., the number of Tx antenna elements in each column). In some examples, the result of the expression 100/N or γ·100/N may be in units of degrees.

In some examples, the value of the beamwidth factor γ may be a number within the range of 1 and 2. In other examples, the value of the beamwidth factor γ may be a number that is greater than or equal to 1. In some aspects of the disclosure, the beamwidth factor γ may be applied to increase the 3 dB beamwidth (e.g., 100/N), thereby allowing a greater discrepancy between the directions of the transmit and receive beams for acceptable beam correspondence. For example, if the beamwidth factor γ is set to 1, a difference between the directions of the transmit and receive beams (e.g., the angle θ 1436) where the receive beam achieves a gain value 3 dB below the gain value of the transmit beam (e.g., 3 dB·1=3 dB) may be considered acceptable beam correspondence. In another example, if the beamwidth factor γ is set to 1.5, a difference (e.g., the angle θ 1436) between the directions of the transmit and receive beams where the receive beam achieves a gain value 4.5 dB below the gain value of the transmit beam (e.g., 3 dB·1.5=4.5 dB) may be considered acceptable beam correspondence.

Determination of the distance threshold ($D_{threshold\_1}$) for the configuration of the transceiver 1402 shown in FIG. 14 will now be described. For example, the wireless communication device 1400 may determine that a beam correspondence failure has occurred when the angle θ 1436 meets or exceeds the 3 dB bandwidth of the transmit beam 1412 or receive beam 1430 as shown with the following condition (8):

$$\frac{180}{\pi} \cdot \frac{m}{D} \geq \gamma \cdot \frac{100}{N} \quad (8)$$

where the expression [(180/π)·(m/D)] represents the value of angle θ 1436 (e.g., as described with reference to equation (4)) and the expression γ·100/N represents the product of the beamwidth factor γ and the 3 dB bandwidth of the transmit beam 1412 or receive beam 1430 as previously described. Since the distance m 1470 may be expressed as aλ·$N_{T1}$ and the antenna dimension N is represented by $N_{T1}$, the condition (8) above may be rewritten as shown in the following condition (9):

$$\frac{180}{\pi} \cdot \frac{a\lambda \cdot N_{T_1}}{D} \geq \gamma \cdot \frac{100}{N_{T_1}}. \quad (9)$$

The above condition (9) may be solved for the distance D to obtain the following condition (10):

$$D \leq \frac{1.8}{\pi} \cdot \frac{a\lambda \cdot N_{T_1}^2}{\gamma}. \quad (10)$$

Therefore, since the wireless communication device 1400 may determine that a beam correspondence failure has occurred when the distance (D) from the Tx antenna array 1404 or the Rx antenna array 1422 to the cluster 1407 (or the object 1416) is less than or equal to the result of the expression [(1.8/π)·(aλ·$N_{T1}^2$)/γ], the result of the expression [(1.8/π)·(aλ·$N_{T1}^2$)/γ] may represent the value of the distance threshold (e.g., $D_{threshold\_1}$) for the example of FIG. 14.

Figure 15:
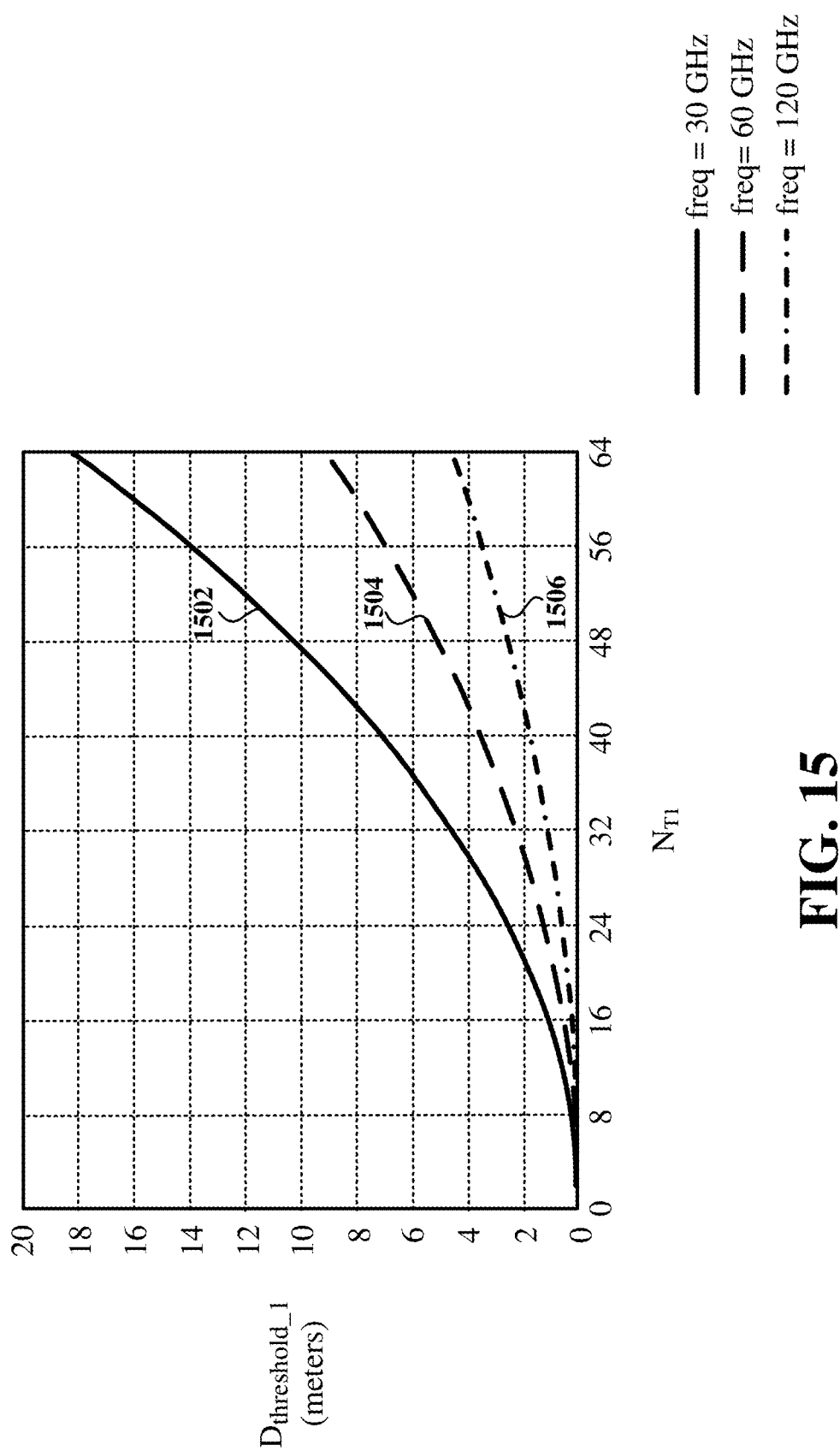
FIG. 15 shows a set of curves illustrating example relationships between an antenna dimension for the Tx antenna array and a distance threshold for the Tx antenna array.

FIG. 15 shows a set of curves illustrating example relationships between the antenna dimension $N_{T1}$ for the Tx antenna array 1404 and the distance threshold (e.g., $D_{threshold\_1}$) for the Tx antenna array 1404 when a is set to 0.7. For example, curve 1502 represents the relationship between the antenna dimension $N_{T1}$ and the distance threshold (e.g., $D_{threshold\_1}$) for the Tx antenna array 1404 when operating at a frequency of 30 GHz, curve 1504 represents the relationship between the antenna dimension $N_{T1}$ and the distance threshold (e.g., $D_{threshold\_1}$) for the Tx antenna array 1404 when operating at a frequency of 60 GHz, and curve 1506 represents the relationship between the antenna dimension $N_{T1}$ and the distance threshold (e.g., $D_{threshold\_1}$) for the Tx antenna array 1404 when operating at a frequency of 120 GHz. In FIG. 15, it should be noted that for a given antenna dimension $N_{T1}$, the distance threshold (e.g., $D_{threshold\_1}$) may be inversely proportional to the frequency of the Tx antenna array 1404. For example, when the antenna dimension $N_{T1}$ is 48, the distance threshold (e.g., $D_{threshold\_1}$) decreases as the operating frequency increases.

Figure 16:
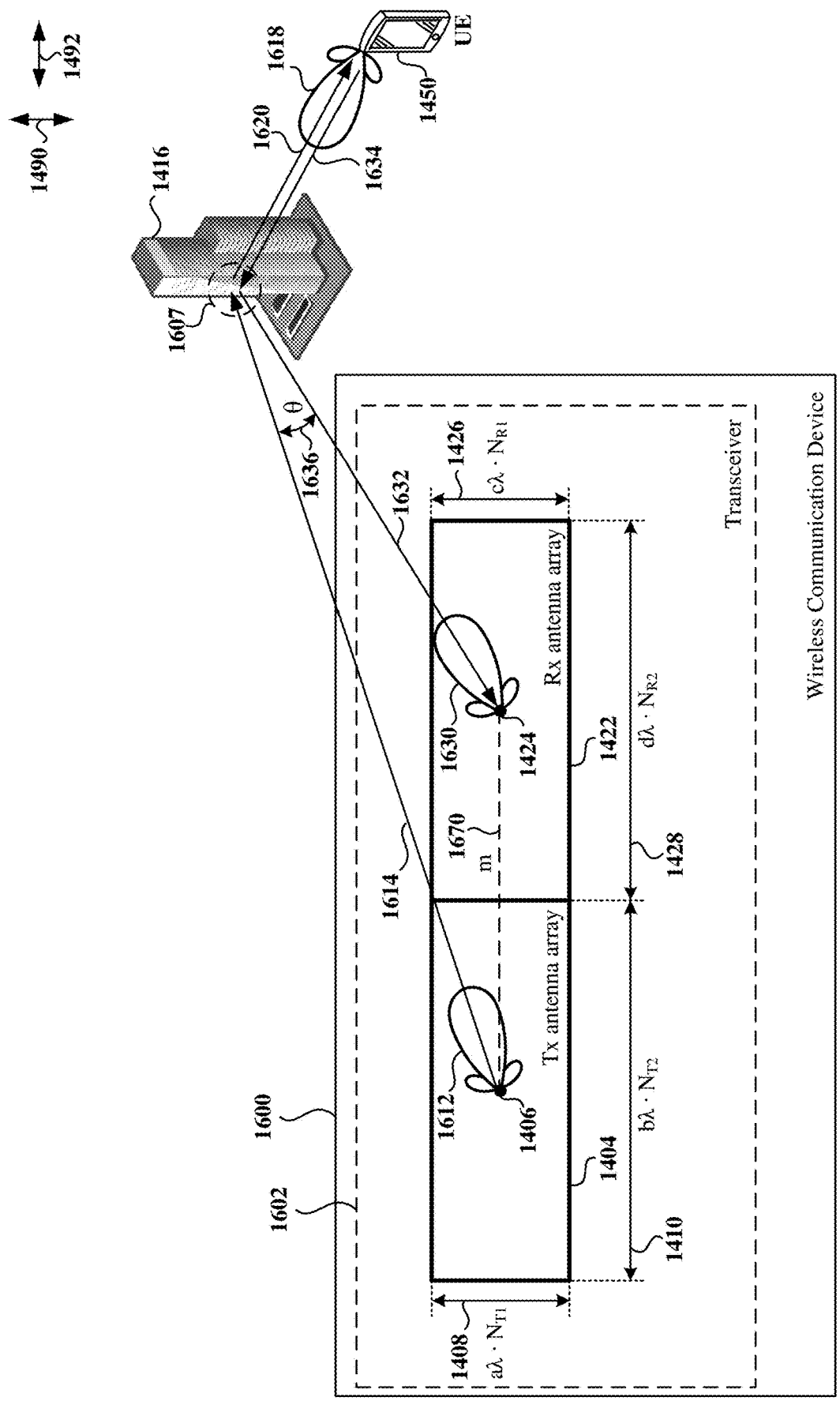
FIG. 16 illustrates a wireless communication device including a transceiver in accordance with various aspects of the disclosure.

FIG. 16 illustrates a wireless communication device 1600 including a transceiver 1602 in accordance with various aspects of the disclosure. In some examples, the wireless communication device 1600 may be a base station. It should be noted that the transceiver 1602 includes the Tx antenna array 1404 and the Rx antenna array 1422 previously described with reference to FIG. 14. However, in the example configuration of the transceiver 1602 shown in FIG. 16, the Tx antenna array 1404 is situated adjacent to the Rx antenna array 1422 in the horizontal direction 1492. The distance m 1670 represents the distance between the center point 1406 of the Tx antenna array 1404 and the center point 1424 of the Rx antenna array 1422.

FIG. 16 further illustrates a transmit beam 1612 formed at the Tx antenna array 1404 and a receive beam 1630 formed at the Rx antenna array 1422. For example, the wireless communication device 1600 may form the transmit beam 1612 to transmit downlink (DL) signals to the UE 1450, and may form the receive beam 1630 to receive uplink (UL) signals from the UE 1450.

The wireless communication device 1600 may determine that the cluster 1607 formed at the object 1416 in the wireless communication channel provides the best signal strength and may form the transmit beam 1612 in a direction toward the cluster 1607.

In FIG. 16, for example, the direction of the transmit beam 1612 toward the cluster 1607 is indicated with the signal transmission path 1614. The wireless communication device 1600 may assume channel reciprocity and may form the receive beam 1630 toward the cluster 1607. In FIG. 16, for example, the direction of the receive beam 1630 toward the cluster 1607 is indicated with the signal reception path 1632. The UE 1450 may form a beam 1618 toward the cluster 1607 for reception of signal transmissions. The UE 1450 may assume channel reciprocity and may use the beam 1618 for signal transmissions toward the cluster 1607. In FIG. 16, for example, the direction of the beam 1618 toward the cluster 1607 is indicated with the signal reception path 1620 and the signal transmission path 1634.

The separation of the Tx antenna array 1404 from the Rx antenna array 1422 may cause the direction of the transmit beam 1612 and the direction of the receive beam 1630 to form an angle θ 1636 at the cluster 1607. In some examples, the angle θ 1636 may represent the difference between the direction of the transmit beam 1612 and the direction of the receive beam 1630.

In one example, as described with reference to FIG. 14, the Tx antenna array 1404 may be the same size as the Rx antenna array 1422 and may have the same inter-antenna element spacing. Therefore, $N_{T1}$ may be equal to $N_{R1}$, $N_{T2}$ may be equal to $N_{R2}$, a may be equal to c, and b may be equal to d. In this example, the wireless communication device 1600 may form the transmit beam 1612 and the receive beam 1630 based on code-book based discrete Fourier transform (DFT) beams with progressive phase shifts and may set the threshold gain control value S to 3 dB.

Determination of the distance threshold (e.g., $D_{threshold\_2}$) for the configuration of the transceiver 1602 in FIG. 16 will now be described. For example, the wireless communication device 1600 may determine that a beam correspondence failure has occurred when the angle θ 1636 meets or exceeds the 3 dB bandwidth of the transmit beam 1612 or receive beam 1630 as shown with the following condition (11):

$$\frac{180}{\pi} \cdot \frac{m}{D} \geq \gamma \cdot \frac{100}{N} \quad (11)$$

where the expression $[(180/\pi) \cdot (m/D)]$ represents the value of angle θ 1636 (e.g., as described with reference to equation (4)) and the expression $\gamma \cdot 100/N$ represents the 3 dB bandwidth of the transmit beam 1612 or receive beam 1630 as previously described. Since the distance m 1670 may be expressed as $b\lambda \cdot N_{T2}$ and the antenna dimension N is represented by $N_{T2}$, the condition (11) above may be rewritten as shown in the following condition (12):

$$\frac{180}{\pi} \cdot \frac{b\lambda \cdot N_{T2}}{D} \geq \gamma \cdot \frac{100}{N_{T2}}. \quad (12)$$

The above condition (12) may be solved for the distance (D) to obtain the following condition (13):

$$D \leq \frac{1.8}{\pi} \cdot \frac{b\lambda \cdot N_{T2}^2}{\gamma}. \quad (13)$$

Therefore, since the wireless communication device 1600 may determine that a beam correspondence failure has occurred when the distance (D) from the Tx antenna array 1404 or the Rx antenna array 1422 to the cluster 1607 (or the object 1416) is less than or equal to the result of the expression $[(1.8/\pi) \cdot (b\lambda \cdot N_{T2}^2)/\gamma]$, the result of the expression $[(1.8/\pi) \cdot (b\lambda \cdot N_{T2}^2)/\gamma]$ may represent the value of the distance threshold (e.g., $D_{threshold\_2}$) for the example of FIG. 16.

Figure 17:
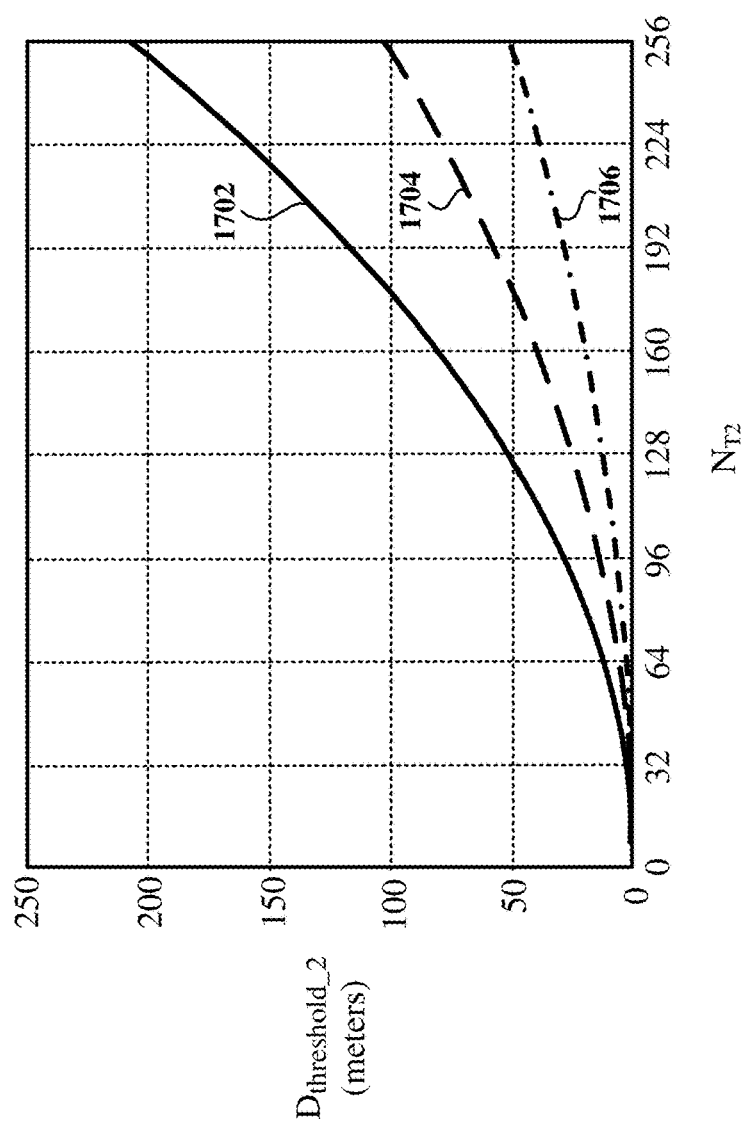
FIG. 17 shows a set of curves illustrating example relationships between an antenna dimension for the Tx antenna array and a distance threshold for the Tx antenna array.

FIG. 17 shows a set of curves illustrating example relationships between the antenna dimension $N_{T2}$ for the Tx antenna array 1404 and the distance threshold (e.g., $D_{threshold\_2}$) for the Tx antenna array 1404 when b is set to 0.5. For example, curve 1702 represents the relationship between the antenna dimension $N_{T2}$ and the distance threshold (e.g., $D_{threshold\_2}$) for the Tx antenna array 1404 when operating at a frequency of 30 GHz, curve 1704 represents the relationship between the antenna dimension $N_{T2}$ and the distance threshold (e.g., $D_{threshold\_2}$) for the Tx antenna array 1404 when operating at a frequency of 60 GHz, and curve 1706 represents the relationship between the antenna dimension $N_{T2}$ and the distance threshold (e.g., $D_{threshold\_2}$) for the Tx antenna array 1404 when operating at a frequency of 120 GHz. In FIG. 17, it should be noted that for a given antenna dimension $N_{T2}$, the distance threshold (e.g., $D_{threshold\_2}$) may be inversely proportional to the frequency of the Tx antenna array 1404. For example, when the antenna dimension $N_{T2}$ is 192, the distance threshold (e.g., $D_{threshold\_2}$) decreases as the operating frequency increases.

In some aspects of the disclosure, the wireless communication device 900 may initiate a beam refinement training procedure for the receive beam 912 or the transmit beam 902 when the indication of the beam correspondence failure is transmitted to the UE 950. The wireless communication device 900 may determine a refined receive beam or a refined transmit beam based on the beam refinement training procedure.

In some aspects of the disclosure, the wireless communication device 900 may indicate a mapping of control information for one or more beams (e.g., transmit beams and/or receive beams) to the UE 950 in response to a determination of a beam correspondence failure. In some examples, the wireless communication device 900 may indicate the mapping of control information with the indication of the beam correspondence failure. For example, the control information may include at least one of a synchronization signal block (SSB) index or a channel state information reference signal (CSI-RS) index. The mapping of control information for one or more transmit beams may indicate different SSBs for the downlink (DL) and/or the uplink (UL) based on an estimate of the angle θ 918. The UE 950 may use the mapping of control information for the one or more beams to decode SSBs.

Figure 18:
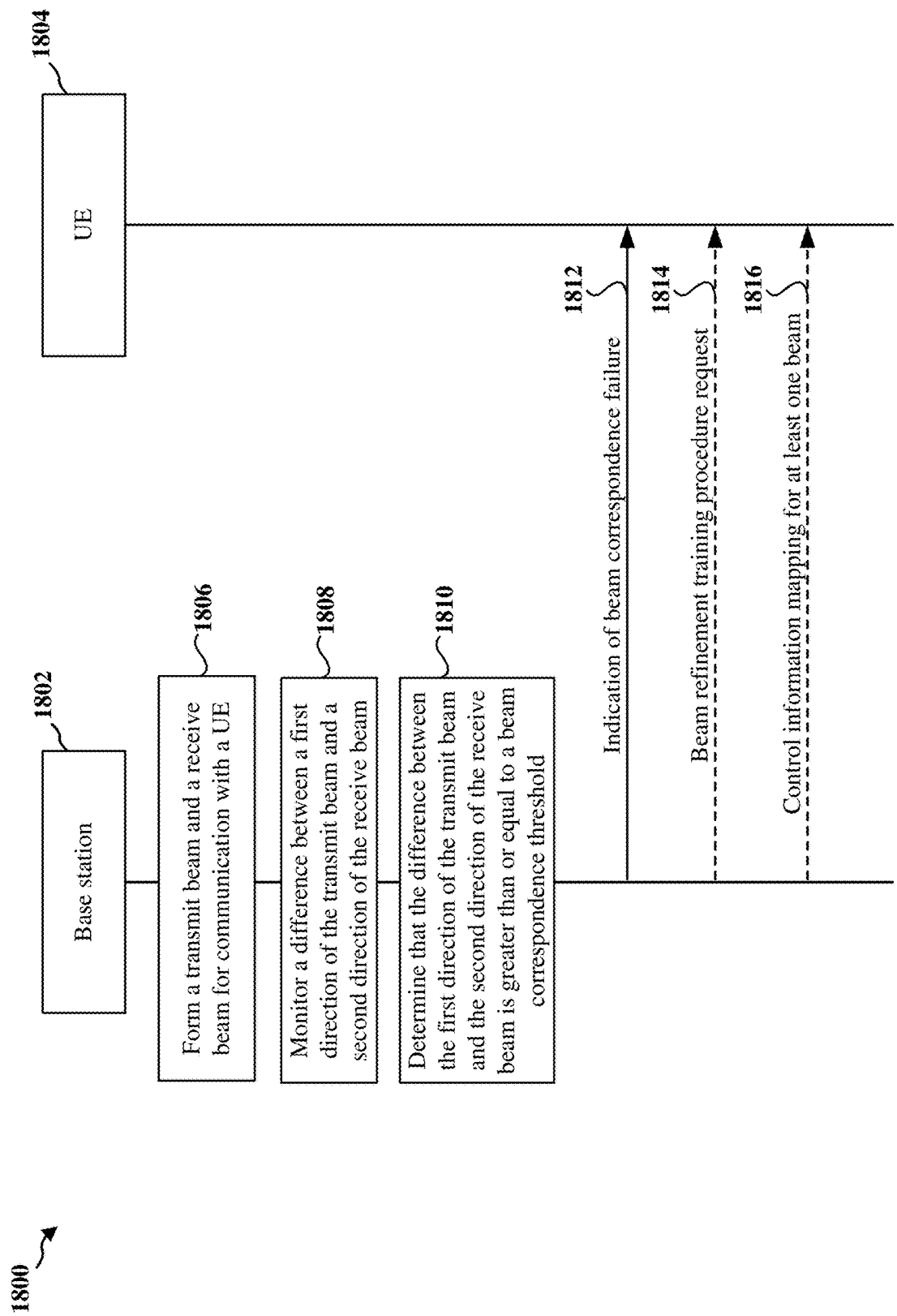
FIG. 18 illustrates a signal flow diagram in accordance with various aspects of the present disclosure.

FIG. 18 illustrates a signal flow diagram 1800 in accordance with various aspects of the present disclosure. The signal flow diagram 1800 may include a base station 1802 and a user equipment 1804. The base station 1802 may correspond to the wireless communication device 900 shown in FIG. 9 and the UE 1804 may correspond to the UE 950 shown in FIG. 9.

At 1806, the base station 1802 may form a transmit beam (e.g., transmit beam 902 in FIG. 9) and a receive beam (e.g., receive beam 912 in FIG. 9) for communication with the UE 1804.

At 1808, the base station 1802 may monitor a difference between a first direction of the transmit beam and a second direction of the receive beam. For example, the difference between the first direction of the transmit beam and the second direction of the receive beam may be the angle θ 918 in FIG. 9.

At 1810, the base station 1802 may determine that the difference between the first direction of the transmit beam and the second direction of the receive beam is greater than or equal to a beam correspondence threshold. For example, the beam correspondence threshold may be the beamwidth φ (e.g., the beamwidth φ 1320) of the transmit beam 902 based on the signal strength threshold (e.g., the threshold gain value K).

The base station 1802 may transmit an indication of a beam correspondence failure to the UE 1804 when the difference (e.g., the angle θ 918) between the direction of the transmit beam and the direction of the receive beam is greater than or equal to the beam correspondence threshold. In some examples, the base station 1802 may transmit a message 1812 to the UE 1804 including a bit field for indicating a beam correspondence failure. For example, the base station 1802 may set a bit in the bit field to a first value (e.g., '1') when a beam correspondence failure has occurred.

The base station 1802 may further transmit a message 1814 including a beam refinement training procedure request when a beam correspondence failure has occurred. In some examples, the message 1814 may be included in the message 1812. The beam refinement training procedure request may initiate a beam refinement training procedure with the UE 1804 to determine a refined transmit beam and/or a refined receive beam.

The base station 1802 may further transmit a message 1816 including a control information mapping for at least one beam (e.g., a transmit beam and/or a receive beam) when a beam correspondence failure has occurred. The control information may include at least one of a synchronization signal block (SSB) index or a channel state information reference signal (CSI-RS) index.

Figure 19:
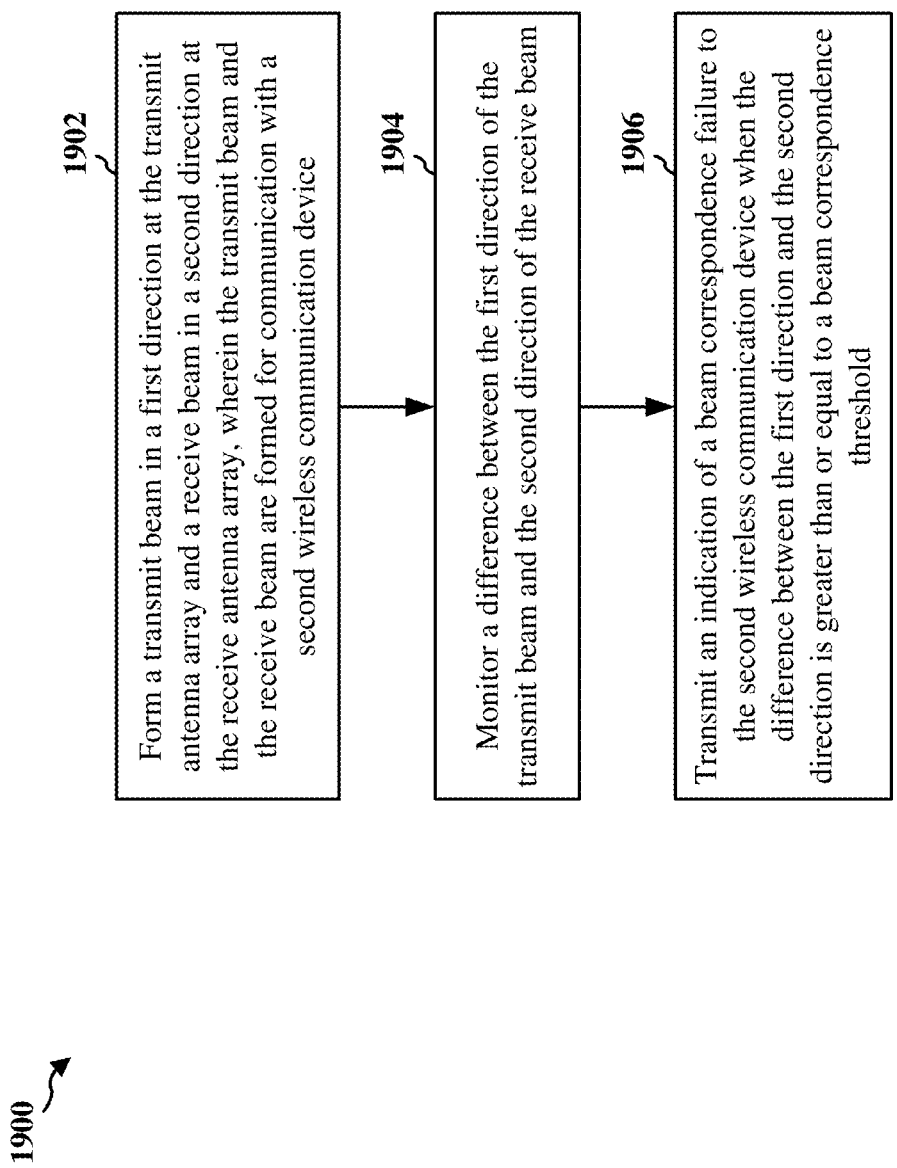
FIG. 19 is a flowchart of a method of wireless communication.

FIG. 19 is a flowchart 1900 of a method of wireless communication. The method may be performed by a first wireless communication device (e.g., the wireless communication device 900, 1400, 1600; the base station 1802; the apparatus 2102/2102'; the processing system 2214, which may include the memory 376 and which may be the entire wireless communication device 900, 1400, 1600 or base station 1802, or a component of the wireless communication device 900, 1400, 1600 or the base station 1802, such as the TX processor 316, the RX processor 370, and/or the controller/processor 375).

At 1902, the first wireless communication device forms a transmit beam in a first direction at a transmit antenna array and a receive beam in a second direction at a receive antenna array, wherein the transmit beam and the receive beam are formed for communication with a second wireless communication device. For example, with reference to FIG. 9, the wireless communication device 900 may form the transmit beam 902 at the Tx antenna array 802 and may form the receive beam 912 at the Rx antenna array 852. The transmit beam 902 and the receive beam 912 may At 1904, the first wireless communication device monitors a difference between the first direction of the transmit beam and the second direction of the receive beam. In some examples, the difference between the first direction and the second direction may be an angle formed between the first direction and the second direction (e.g., the angle θ 918).

In some examples, with reference to FIG. 9, the wireless communication device 900 may monitor the difference between the first direction of the transmit beam and the second direction of the receive beam by determining the difference (e.g., the angle θ 918) between the first direction and the second direction based on a size of the transmit antenna array (e.g., the size $N_{T1} \times N_{T2}$ of the transmit antenna array 802), a size of the receive antenna array (e.g., the size $N_{R1} \times N_{R2}$ of the receive antenna array 852), the geometry (e.g., shape) of the transmit antenna array 802, the geometry (e.g., shape) of the receive antenna array 852, an arrangement (e.g., rows, columns) of transmit antenna elements in the transmit antenna array, an arrangement (e.g., rows, columns) of receive antenna elements in the receive antenna array, a set of beam weights associated with the transmit beam (e.g., the transmit beam 902), a set of beam weights associated with the receive beam (e.g., the receive beam 912), a distance between the transmit antenna array 802 and the receive antenna array 852 (e.g., the distance m between the center of the transmit antenna array 802 (e.g., at center point 804) and the center of the receive antenna array 852 (e.g., at center point 854)), and/or a distance from the transmit antenna array or the receive antenna array to a cluster in a channel over which energy is steered between the first and second wireless communication devices (e.g., a distance between the center point 804 of the transmit antenna array 802 to the cluster 907). For example, the wireless communication device 900 may apply one or more of the values above, or a combination of the values above, to equation (4) or equation (5) to determine the angle θ 918.

In some aspects of the disclosure, monitoring the difference between the first direction of the transmit beam and the second direction of the receive beam may include determining a distance from the transmit antenna array or the receive antenna array to a cluster in a channel over which energy is steered between the first and second wireless communication devices (e.g., a distance between the center point 804 of the transmit antenna array 802 to the cluster 907) and determining the difference between the first direction and the second direction based on the distance. For example, the wireless communication device 900 may apply the distance between the center point 804 of the transmit antenna array 802 to the cluster 907 to equation (4) or equation (5) to determine the angle θ 918.

In some examples, the first wireless communication device may determine the distance from the transmit antenna array or the receive antenna array to the cluster by estimating a distance from the first wireless communication device to the second wireless communication device. In some examples, the first wireless communication device may determine the distance from the transmit antenna array or the receive antenna array to the cluster based on a location of at least one object capable of reflecting, diffracting or scattering wireless communication signals. In some examples, the first wireless communication device may determine the distance from the transmit antenna array or the receive antenna array to the cluster by receiving, from the second wireless communication device, at least one of a path loss estimate or information indicating a location of at least one object capable of reflecting, diffracting or scattering wireless communication signals, and determining the distance from the transmit antenna array or the receive antenna array to the cluster based on the path loss estimate or the location of the at least one object capable of reflecting, diffracting or scattering wireless communication signals.

In some examples, monitoring the difference between the first direction of the transmit beam and the second direction of the receive beam may include determining a distance from the first wireless communication device to a cluster in a channel over which energy is steered between the first and second wireless communication devices, and determining the difference (e.g., the angle θ 918) between the first and second directions based on the distance. For example, the first wireless communication device may apply the distance between the center point 804 of the transmit antenna array 802 to the cluster 907 to equation (4) or equation (5) to determine the angle θ 918.

In some aspects of the disclosure, monitoring the difference between the first direction of the transmit beam and the second direction of the receive beam may include comparing the difference (e.g., the angle θ 918) between the direction of the transmit beam and the direction of the receive beam to the beam correspondence threshold. For example, the beam correspondence threshold may be the beamwidth (p (e.g., the beamwidth (p 1320) corresponding to the signal strength threshold (e.g., the threshold gain value K). In some aspects of the disclosure, monitoring the difference between the first direction of the transmit beam and the second direction of the receive beam may include comparing the estimated distance (e.g., $D_{est}$) to a distance threshold (e.g., $D_{threshold}$, $D_{threshold\_1}$, or $D_{threshold\_2}$).

Finally, at 1906, the first wireless communication device transmits an indication (e.g., message 1812 in FIG. 18) of a beam correspondence failure to the second wireless communication device when the difference between the first direction and the second direction is greater than or equal to the beam correspondence threshold. For example, the beam correspondence threshold may be the beamwidth φ (e.g., the beamwidth φ 1320) corresponding to the signal strength threshold (e.g., the threshold gain value K).

Figure 20A:
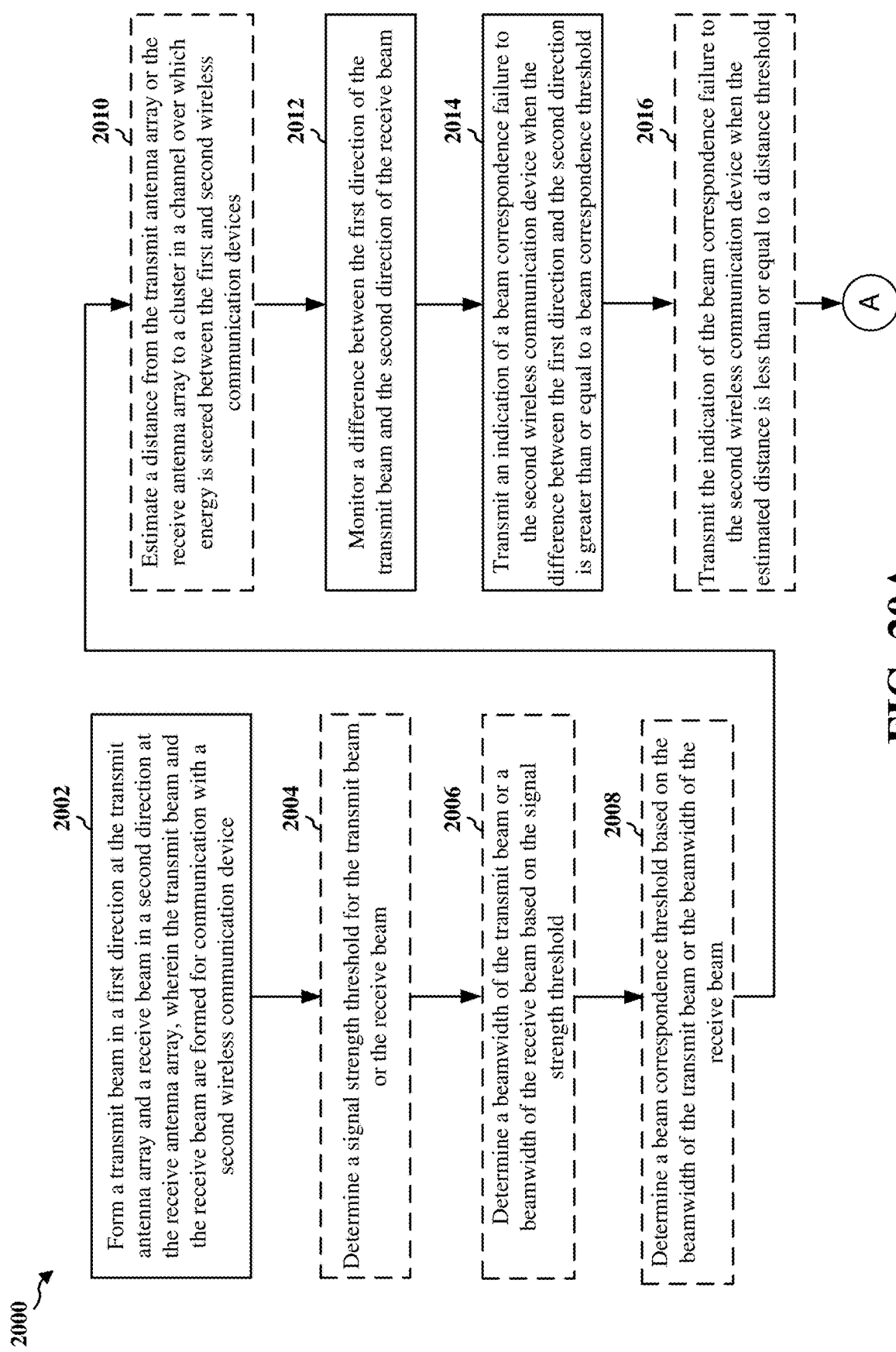
FIGS. 20A and 20B are a flowchart of a method of wireless communication.
Figure 20B:
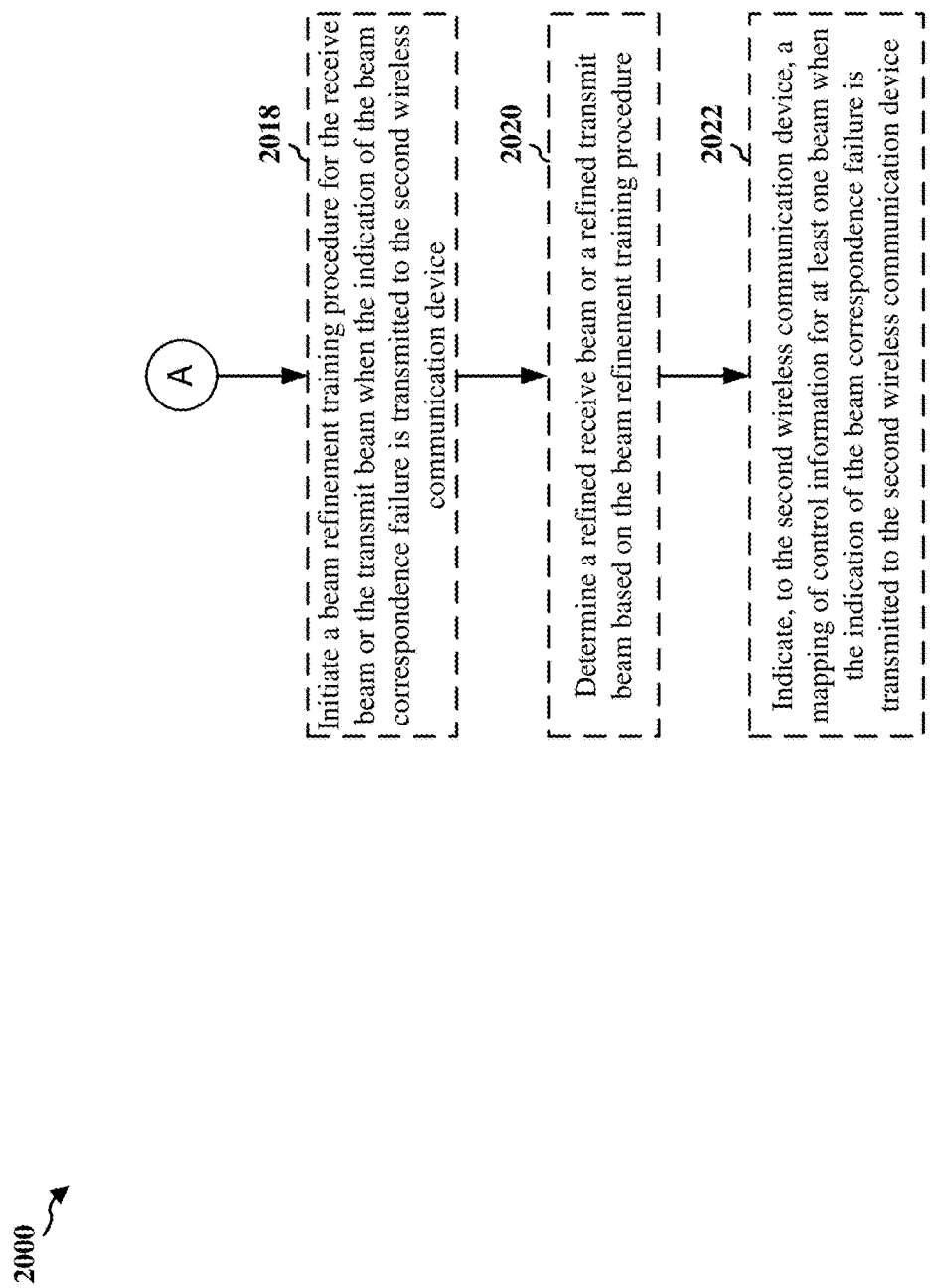

FIGS. 20A and 20B are a flowchart 2000 of a method of wireless communication. The method may be performed by a first wireless communication device (e.g., the wireless communication device 900, 1400, 1600; the base station 1802; the apparatus 2102/2102'; the processing system 2214, which may include the memory 376 and which may be the entire wireless communication device 900, 1400, 1600 or base station 1802, or a component of the wireless communication device 900, 1400, 1600 or the base station 1802, such as the TX processor 316, the RX processor 370, and/or the controller/processor 375). In FIGS. 20A and 20B, operations shown in dashed lines represent optional operations.

At 2002, the first wireless communication device forms a transmit beam in a first direction at a transmit antenna array and a receive beam in a second direction at a receive antenna array, wherein the transmit beam and the receive beam are formed for communication with a second wireless communication device. For example, with reference to FIG. 9, the wireless communication device 900 may form the transmit beam 902 at the Tx antenna array 802 and may form the receive beam 912 at the Rx antenna array 852. The transmit beam 902 and the receive beam 912 may be formed for communication with the UE 950.

At 2004, the first wireless communication device determines a signal strength threshold for the transmit beam or the receive beam. For example, with reference to FIG. 13, the signal strength threshold may be the previously described threshold gain value K. In some examples, the first wireless communication device may determine the signal strength threshold for the transmit beam or the receive beam by determining a difference between a peak gain value for the transmit beam or the receive beam (e.g., the peak gain value G in FIG. 13) and a threshold gain control value (e.g., the threshold gain control value S 1306 in FIG. 13). In some examples, the first wireless communication device may determine the threshold gain control value S to be 3 dB. In other examples, the first wireless communication device may determine the threshold gain control value S to be a value less than 3 dB or greater than 3 dB. In some examples, the first wireless communication device may determine the threshold gain control value S in coordination with a second wireless communication device (e.g., UE 950, a CPE) in the network.

At 2006, the first wireless communication device determines a beamwidth (e.g., beamwidth φ) of the transmit beam or a beamwidth of the receive beam based on the signal strength threshold. For example, with reference to FIG. 13, the first wireless communication device may locate the points where the pattern of the transmit beam 902 intersects the signal strength threshold (e.g., the points 1308, 1310 along the dotted line indicating the threshold gain value K). The beamwidth φ(e.g., the beamwidth φ1320) may be defined between these points (e.g., the points 1308, 1310).

At 2008, the first wireless communication device determines a beam correspondence threshold based on the beamwidth of the transmit beam or the beamwidth of the receive beam. In some examples, the first wireless communication device may determine the beam correspondence threshold to be the beamwidth φ (e.g., the beamwidth φ 1320) of the transmit beam 902 based on the signal strength threshold (e.g., the threshold gain value K).

At 2010, the first wireless communication device estimates a distance (e.g., $D_{est}$) from the transmit antenna array or the receive antenna array to a cluster in a channel over which energy is steered between the first and second wireless communication devices. In some examples, with reference to FIG. 9, the wireless communication device 900 may estimate the distance from the transmit antenna array 802 or the receive antenna array 852 to the cluster 907 in the wireless communication channel by estimating the distance from the wireless communication device 900 to the UE 950 based on a location of the UE 950. For example, the wireless communication device 900 may determine the location of the UE 950 based on a positioning algorithm that indicates the location of the UE 950.

For example, in scenarios where the wireless communication device 900 does not have a line of sight (LOS) to a second wireless communication device (e.g., the UE 950), the distance from the Tx antenna array 802 or the Rx antenna array 852 to the cluster 907 may be different from the distance from the Tx antenna array 802 or the Rx antenna array 852 to the second wireless communication device (e.g., the UE 950). In these scenarios, the wireless communication device 900 may estimate the distance from the Tx antenna array 802 or the Rx antenna array 852 to the cluster 907 in the wireless communication channel based on a location of an object (e.g., the object 906) capable of reflecting, diffracting or scattering wireless communication signals.

In some examples, the wireless communication device 900 may determine the distance to the cluster 907 based on the location of the wireless communication device 900 and information about the static environment around the wireless communication device 900 (e.g., installation information indicating locations of buildings, fixtures, or other structures). In some examples, the wireless communication device 900 may use path loss estimates from the second wireless communication device (e.g., the UE 950) in combination with the location of the wireless communication device 900 and information about the static environment around the wireless communication device 900 to estimate the distance between the wireless communication device 900 and the cluster 907.

At 2012, the first wireless communication device monitors a difference between the first direction of the transmit beam and the second direction of the receive beam. In some examples, the difference between the first direction and the second direction may be an angle formed between the first direction and the second direction (e.g., the angle θ 918).

In some examples, with reference to FIG. 9, the wireless communication device 900 may monitor the difference between the first direction of the transmit beam and the second direction of the receive beam by determining the difference (e.g., the angle θ 918) between the first direction and the second direction based on a size of the transmit antenna array (e.g., the size $N_{T1} \times N_{T2}$ of the transmit antenna array 802), a size of the receive antenna array (e.g., the size $N_{R1} \times N_{R2}$ of the receive antenna array 852), the geometry (e.g., shape) of the transmit antenna array 802, the geometry (e.g., shape) of the receive antenna array 852, an arrangement (e.g., rows, columns) of transmit antenna elements in the transmit antenna array, an arrangement (e.g., rows, columns) of receive antenna elements in the receive antenna array, a set of beam weights associated with the transmit beam (e.g., the transmit beam 902), a set of beam weights associated with the receive beam (e.g., the receive beam 912), a distance between the transmit antenna array 802 and the receive antenna array 852 (e.g., the distance m between the center of the transmit antenna array 802 (e.g., at center point 804) and the center of the receive antenna array 852 (e.g., at center point 854)), and/or a distance from the transmit antenna array or the receive antenna array to a cluster in a channel over which energy is steered between the first and second wireless communication devices (e.g., a distance between the center point 804 of the transmit antenna array 802 to the cluster 907). For example, the wireless communication device 900 may apply one or more of the values above, or a combination of the values above, to equation (4) or equation (5) to determine the angle θ 918.

In some aspects of the disclosure, monitoring the difference between the first direction of the transmit beam and the second direction of the receive beam may include determining a distance from the transmit antenna array or the receive antenna array to a cluster in a channel over which energy is steered between the first and second wireless communication devices (e.g., a distance between the center point 804 of the transmit antenna array 802 to the cluster 907) and determining the difference between the first direction and the second direction based on the distance. For example, the wireless communication device 900 may apply the distance between the center point 804 of the transmit antenna array 802 to the cluster 907 to equation (4) or equation (5) to determine the angle θ 918.

In some examples, the first wireless communication device may determine the distance from the transmit antenna array or the receive antenna array to the cluster by estimating a distance from the first wireless communication device to the second wireless communication device. In some examples, the first wireless communication device may determine the distance from the transmit antenna array or the receive antenna array to the cluster based on a location of at least one object capable of reflecting, diffracting or scattering wireless communication signals. In some examples, the first wireless communication device may determine the distance from the transmit antenna array or the receive antenna array to the cluster by receiving, from the second wireless communication device, at least one of a path loss estimate or information indicating a location of at least one object capable of reflecting, diffracting or scattering wireless communication signals, and determining the distance from the transmit antenna array or the receive antenna array to the cluster based on the path loss estimate or the location of the at least one object capable of reflecting, diffracting or scattering wireless communication signals.

In some examples, monitoring the difference between the first direction of the transmit beam and the second direction of the receive beam may include determining a distance from the first wireless communication device to a cluster in a channel over which energy is steered between the first and second wireless communication devices, and determining the difference (e.g., the angle θ 918) between the first and second directions based on the distance. For example, the first wireless communication device may apply the distance between the center point 804 of the transmit antenna array 802 to the cluster 907 to equation (4) or equation (5) to determine the angle θ 918.

In some aspects of the disclosure, monitoring the difference between the first direction of the transmit beam and the second direction of the receive beam may include comparing the difference (e.g., the angle θ 918) between the direction of the transmit beam and the direction of the receive beam to the beam correspondence threshold. For example, the beam correspondence threshold may be the beamwidth p (e.g., the beamwidth φ 1320) corresponding to the signal strength threshold (e.g., the threshold gain control value S). In some aspects of the disclosure, monitoring the difference between the first direction of the transmit beam and the second direction of the receive beam may include comparing the estimated distance (e.g., $D_{est}$) to a distance threshold (e.g., $D_{threshold}$, $D_{threshold\_1}$, or $D_{threshold\_2}$).

At 2014, the first wireless communication device transmits an indication of a beam correspondence failure (e.g., message 1812 in FIG. 18) to the second wireless communication device when the difference between the first direction and the second direction is greater than or equal to the beam correspondence threshold. For example, the beam correspondence threshold may be the beamwidth φ (e.g., the beamwidth (p 1320) corresponding to the signal strength threshold (e.g., the threshold gain value K).

At 2016, the first wireless communication device transmits the indication of the beam correspondence failure to the second wireless communication device when the estimated distance (e.g., $D_{est}$) is less than or equal to the distance threshold (e.g., $D_{threshold}$, $D_{threshold\_1}$, or $D_{threshold\_2}$). In some examples, the distance threshold (e.g., $D_{threshold}$, $D_{threshold\_1}$, or $D_{threshold\_2}$) is a value based on at least one of a beamwidth of the transmit beam or the receive beam, a size of the transmit antenna array, a size of the receive antenna array, a spacing of transmit antenna elements in the transmit antenna array, a spacing of receive antenna elements in the receive antenna array, or a beamwidth factor (e.g., the beamwidth factor γ described in detail herein).

At 2018, the first wireless communication device initiates a beam refinement training procedure for the receive beam or the transmit beam when the indication of the beam correspondence failure is transmitted to the second wireless communication device. For example, the beam refinement training procedure for the receive beam or the transmit beam may include the separate beam training procedures described with reference to FIG. 10.

At 2020, the first wireless communication device determines a refined receive beam or a refined transmit beam based on the beam refinement training procedure. The refined receive beam or the refined transmit beam may provide increased gain and may improve the performance of the first wireless communication device and/or the second wireless communication device.

At 2022, the first wireless communication device indicates, to the second wireless communication device, a mapping of control information for at least one beam when the indication of the beam correspondence failure is transmitted to the second wireless communication device. In some examples, the control information includes at least one of a synchronization signal block (SSB) index or a channel state information reference signal (CSI-RS) index.

Figure 21:
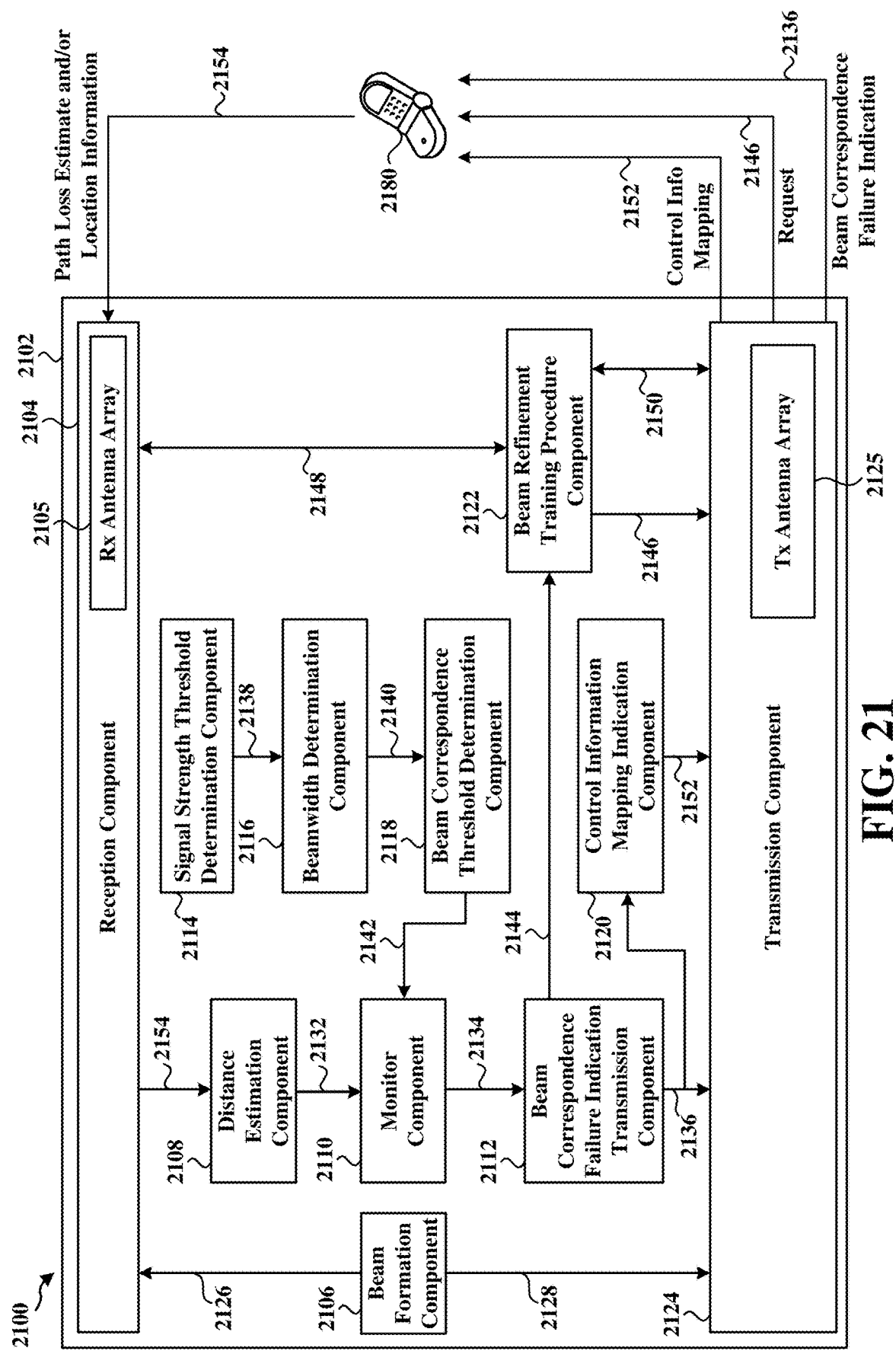
FIG. 21 is a conceptual data flow diagram illustrating the data flow between different means/components in an example apparatus.

FIG. 21 is a conceptual data flow diagram 2100 illustrating the data flow between different means/components in an example apparatus 2102. The apparatus 2102 (also referred to as a first wireless communication device) may be a base station. The apparatus includes a reception component 2104 that receives UL signals from a second wireless communication device (e.g., the UE 2180). For example, the UL signals may include the signal 2154 including a path loss estimate and/or location information (e.g., information indicating a location of at least one object (e.g., 906, 1416) capable of reflecting, diffracting or scattering wireless communication signals).

The apparatus further includes a beam formation component 2106 that forms a transmit beam in a first direction at the transmit antenna array (e.g., the Tx antenna array 2125 coupled to the transmission component 2124) and a receive beam in a second direction at the receive antenna array (e.g., the Rx antenna array 2105 coupled to the reception component 2104), wherein the transmit beam and the receive beam are formed for communication with the second wireless communication device (e.g., the UE 2180). For example, the beam formation component 2106 may provide a set of beam weights 2126 to be applied at the Rx antenna array 2105, and a set of beam weights 2128 to be applied at the Tx antenna array 2125.

The apparatus further includes a distance estimation component 2108 that estimates a distance from the transmit antenna array (e.g., the Tx antenna array 2125) or the receive antenna array (e.g., the Rx antenna array 2105) to a cluster in a channel over which energy is steered between the first and second wireless communication devices (e.g., between the apparatus 2102 and the UE 2180). In some examples, the distance estimation component 2108 may use the path loss estimate and/or location information received via the signal 2154 to obtain the estimated distance 2132.

The apparatus further includes a monitor component 2110 that monitors a difference between the first direction of the transmit beam and the second direction of the receive beam. The monitor component 2110 may provide a signal 2134 indicating whether a beam correspondence failure has occurred. For example, the signal 2134 may indicate a beam correspondence failure has occurred when the monitor component 2110 determines that the difference between the first direction and the second direction is greater than or equal to a beam correspondence threshold. In another example, the signal 2134 may indicate a beam correspondence failure has occurred when the monitor component 2110 determines that the estimated distance 2132 is less than or equal to a distance threshold.

The apparatus further includes a beam correspondence failure indication transmission component 2112 that transmits an indication of a beam correspondence failure 2136 (e.g., via the transmission component 2124) to the second wireless communication device (e.g., the UE 2180) when the difference between the first direction and the second direction is greater than or equal to the beam correspondence threshold or when the estimated distance 2132 is less than or equal to a distance threshold.

The apparatus further includes a signal strength threshold determination component 2114 that determines a signal strength threshold 2138 (e.g., the threshold gain value K) for the transmit beam or the receive beam. In some examples, the apparatus determines the signal strength threshold for the transmit beam or the receive beam by determining a difference between a peak gain value for the transmit beam or the receive beam (e.g., the peak gain value G) and the threshold gain control value (e.g., the threshold gain control value S).

The apparatus further includes a beamwidth determination component 2116 that determines the beamwidth 2140 (e.g., the beamwidth φ1320 based on the points 1308 and 1310 in FIG. 13) of the transmit beam or the beamwidth of the receive beam based on the signal strength threshold (e.g., the threshold gain value K).

The apparatus further includes a beam correspondence threshold determination component 2118 that determines a beam correspondence threshold 2142 based on a beamwidth of the transmit beam or a beamwidth of the receive beam. In some examples, the beam correspondence threshold 2142 may be the beamwidth 2140 (e.g., the beamwidth φ1320 based on the points 1308 and 1310 in FIG. 13).

The apparatus further includes a control information mapping indication component 2120 that indicates, to the second wireless communication device (e.g., the UE 2180), a mapping of control information 2152 for at least one beam when the indication of the beam correspondence failure 2136 is transmitted to the second wireless communication device. For example, the control information may include a synchronization signal block (SSB) index and/or a channel state information reference signal (CSI-RS) index.

The apparatus further includes a beam refinement training procedure component 2122 that initiates a beam refinement training procedure (e.g., via the beam refinement training procedure request 2146) for the receive beam or the transmit beam when the indication of the beam correspondence failure 2136 is transmitted to the second wireless communication device (e.g., the UE 2180). The beam refinement training procedure component 2122 may control the Rx antenna array 2105 via the data path 2148 and the Tx antenna array 2125 via the data path 2150 to perform the beam refinement training procedure to determine a refined receive beam and/or a refined transmit beam.

The apparatus further includes a transmission component 2124 that transmits DL signals to the second wireless communication device (e.g., the UE 2180). The DL signals may include the indication of the beam correspondence failure 2136, the beam refinement training procedure request 2146, and/or the mapping of control information 2152 for at least one beam.

The apparatus may include additional components that perform each of the blocks of the algorithm in the aforementioned flowcharts of FIGS. 19, 20A, 20B. As such, each block in the aforementioned flowcharts of FIGS. 19, 20A, 20B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 22:
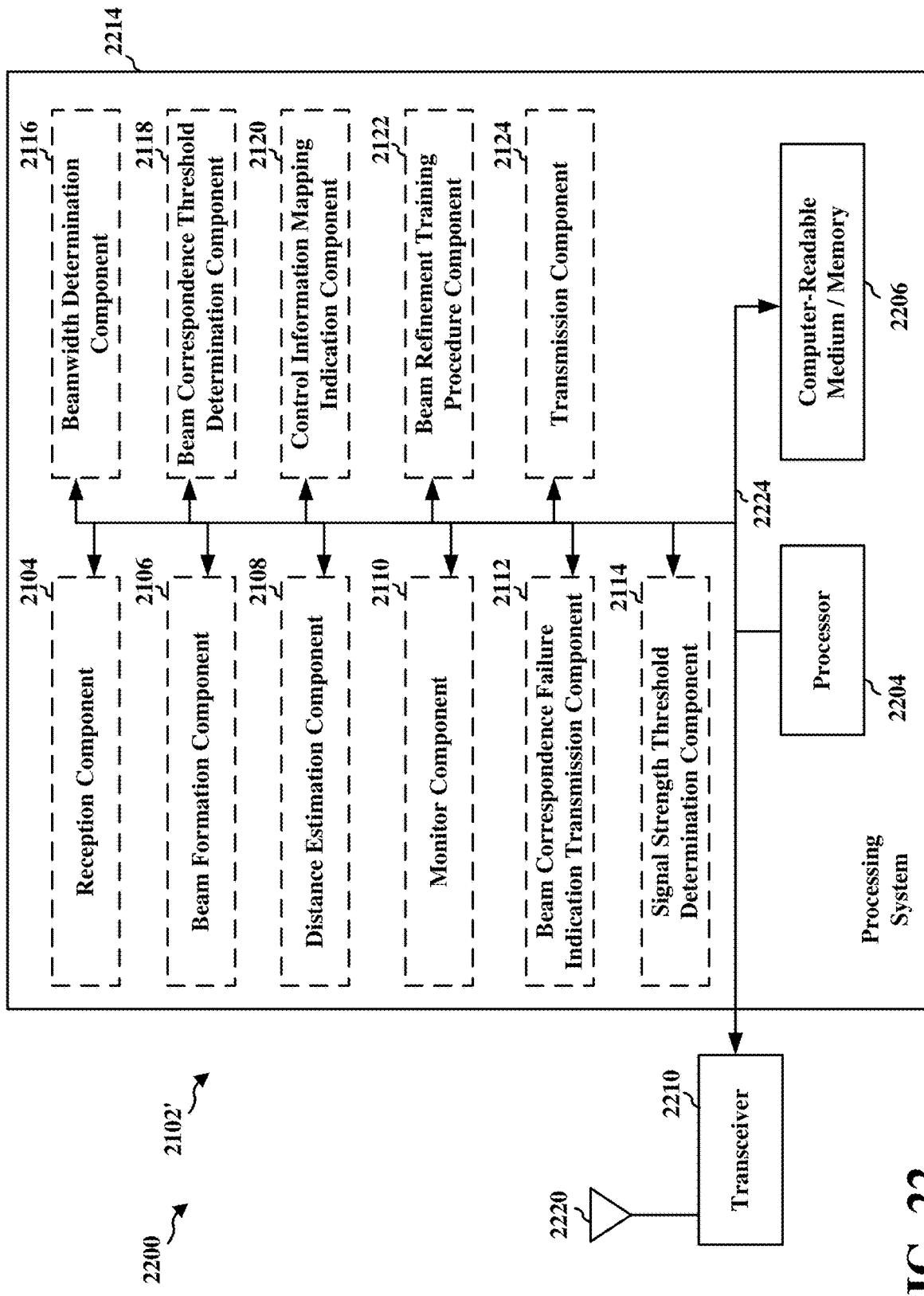
FIG. 22 is a diagram illustrating an example of a hardware implementation for an apparatus employing a processing system.

FIG. 22 is a diagram 2200 illustrating an example of a hardware implementation for an apparatus 2102' employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware components, represented by the processor 2204, the components 2104, 2106, 2108, 2110, 2112, 2114, 2116, 2118, 2120, 2122, and 2124 and the computer-readable medium/memory 2206. The bus 2224 may also link various other circuits such as timing sources, peripherals, voltage regulators, and power management circuits, which are well known in the art, and therefore, will not be described any further.

The processing system 2214 may be coupled to a transceiver 2210. The transceiver 2210 is coupled to one or more antennas 2220. The transceiver 2210 provides a means for communicating with various other apparatus over a transmission medium. The transceiver 2210 receives a signal from the one or more antennas 2220, extracts information from the received signal, and provides the extracted information to the processing system 2214, specifically the reception component 2104. In addition, the transceiver 2210 receives information from the processing system 2214, specifically the transmission component 2124, and based on the received information, generates a signal to be applied to the one or more antennas 2220. The processing system 2214 includes a processor 2204 coupled to a computer-readable medium/memory 2206. The processor 2204 is responsible for general processing, including the execution of software stored on the computer-readable medium/memory 2206. The software, when executed by the processor 2204, causes the processing system 2214 to perform the various functions described supra for any particular apparatus. The computer-readable medium/memory 2206 may also be used for storing data that is manipulated by the processor 2204 when executing software. The processing system 2214 further includes at least one of the components 2104, 2106, 2108, 2110, 2112, 2114, 2116, 2118, 2120, 2122, and 2124. The components may be software components running in the processor 2204, resident/stored in the computer readable medium/memory 2206, one or more hardware components coupled to the processor 2204, or some combination thereof. The processing system 2214 may be a component of the base station 310 and may include the memory 376 and/or at least one of the TX processor 316, the RX processor 370, and the controller/processor 375. Alternatively, the processing system 2214 may be the entire base station (e.g., see 310 of FIG. 3).

In one configuration, the apparatus 2102/2102' for wireless communication includes means for forming a transmit beam in a first direction at the transmit antenna array and a receive beam in a second direction at the receive antenna array, wherein the transmit beam and the receive beam are formed for communication with a second wireless communication device, means for monitoring a difference between the first direction of the transmit beam and the second direction of the receive beam, means for transmitting an indication of a beam correspondence failure to the second wireless communication device when the difference between the first direction and the second direction is greater than or equal to a beam correspondence threshold, means for determining the beam correspondence threshold based on a beamwidth of the transmit beam or a beamwidth of the receive beam, means for determining a signal strength threshold for the transmit beam or the receive beam, means for determining the beamwidth of the transmit beam or the beamwidth of the receive beam based on the signal strength threshold, means for estimating a distance from the transmit antenna array or the receive antenna array to a cluster in a channel over which energy is steered between the first and second wireless communication devices, means for transmitting the indication of the beam correspondence failure to the second wireless communication device when the estimated distance is less than or equal to a distance threshold, means for initiating a beam refinement training procedure for the receive beam or the transmit beam when the indication of the beam correspondence failure is transmitted to the second wireless communication device, means for determining a refined receive beam or a refined transmit beam based on the beam refinement training procedure, means for indicating, to the second wireless communication device, a mapping of control information for at least one beam when the indication of the beam correspondence failure is transmitted to the second wireless communication device.

The aforementioned means may be one or more of the aforementioned components of the apparatus 2102 and/or the processing system 2214 of the apparatus 2102' configured to perform the functions recited by the aforementioned means. As described supra, the processing system 2214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

In the aspects described herein, a first wireless communication device (e.g., a base station) including separate Tx and Rx antenna arrays may dynamically determine any occurrences of beam correspondence failures by monitoring the difference between the direction of a transmit beam and the direction of a receive beam. The first wireless communication device may compare the difference between the direction of the transmit beam and the direction of the receive beam to an appropriate beam correspondence threshold to determine any occurrences of beam correspondence failures.

The dynamic determination of beam correspondence failures according to the aspects described herein may enable the first wireless communication device to assume channel reciprocity when forming the transmit and receive beams for communication with a second wireless communication device (e.g., a UE), and to selectively perform a separate beam training procedure for the receive beam and/or the transmit beam in response to a beam correspondence failure. Therefore, the aspects described herein may allow the first wireless communication device to avoid delays and reduce the network overhead typically associated with separate beam training procedures for transmit and receive beams.

The following provides an overview of aspects of the present disclosure:

Aspect 1: A method for a first wireless communication device including a transmit antenna array and a receive antenna array, the transmit antenna array being separate from the receive antenna array, comprising: forming a transmit beam in a first direction at the transmit antenna array and a receive beam in a second direction at the receive antenna array, wherein the transmit beam and the receive beam are formed for communication with a second wireless communication device; monitoring a difference between the first direction of the transmit beam and the second direction of the receive beam; and transmitting an indication of a beam correspondence failure to the second wireless communication device when the difference between the first direction and the second direction is greater than or equal to a beam correspondence threshold.

Aspect 2: The method of aspect 1, wherein monitoring the difference between the first direction and the second direction comprises determining the difference between the first direction and the second direction based on at least one of a size of the transmit antenna array, a size of the receive antenna array, an arrangement of transmit antenna elements in the transmit antenna array, an arrangement of receive antenna elements in the receive antenna array, a set of beam weights associated with the transmit beam, a set of beam weights associated with the receive beam, a distance between the transmit antenna array and the receive antenna array, or a distance from the transmit antenna array or the receive antenna array to a cluster in a channel over which energy is steered between the first and second wireless communication devices.

Aspect 3: The method of aspect 1 or 2, wherein the difference between the first direction and the second direction is an angle formed between the first direction and the second direction.

Aspect 4: The method of any one of aspects 1 through 3, further comprising: determining the beam correspondence threshold based on a beamwidth of the transmit beam or a beamwidth of the receive beam.

Aspect 5: The method of aspect 4, further comprising: determining a signal strength threshold for the transmit beam or the receive beam; and determining the beamwidth of the transmit beam or the beamwidth of the receive beam based on the signal strength threshold.

Aspect 6: The method of aspect 5, wherein determining the signal strength threshold for the transmit beam or the receive beam comprises: determining a difference between a peak gain value for the transmit beam or the receive beam and a threshold gain control value.

Aspect 7: The method of any one of aspects 1 through 6, wherein monitoring the difference between the first direction and the second direction comprises: determining a distance from the transmit antenna array or the receive antenna array to a cluster in a channel over which energy is steered between the first and second wireless communication devices; and determining the difference between the first direction and the second direction based on the distance.

Aspect 8: The method of aspect 7, wherein determining the distance from the transmit antenna array or the receive antenna array to the cluster in the channel which steers the energy between the first and second wireless communication devices comprises estimating a distance from the first wireless communication device to the second wireless communication device.

Aspect 9: The method of aspect 7, wherein the distance from the transmit antenna array or the receive antenna array to the cluster in the channel which steers the energy between the first and second wireless communication devices is determined based on a location of at least one object capable of reflecting, diffracting or scattering wireless communication signals.

Aspect 10: The method of aspect 7, wherein determining the distance from the transmit antenna array or the receive antenna array to the cluster in the channel which steers the energy between the first and second wireless communication devices comprises: receiving, from the second wireless communication device, at least one of a path loss estimate or information indicating a location of at least one object capable of reflecting, diffracting or scattering wireless communication signals; and determining the distance from the transmit antenna array or the receive antenna array to the cluster based on the path loss estimate or the location of the at least one object capable of reflecting, diffracting or scattering wireless communication signals.

Aspect 11: The method of any one of aspects 1 through 6, wherein monitoring the difference between the first direction and the second direction comprises: determining a distance from the first wireless communication device to a cluster in a channel over which energy is steered between the first and second wireless communication devices; and determining the difference between the first and second directions based on the distance.

Aspect 12: The method of any one of aspects 1 through 11, further comprising: estimating a distance from the transmit antenna array or the receive antenna array to a cluster in a channel over which energy is steered between the first and second wireless communication devices; and transmitting the indication of the beam correspondence failure to the second wireless communication device when the estimated distance is less than or equal to a distance threshold.

Aspect 13: The method of aspect 12, wherein the distance threshold is a value based on at least one of a beamwidth of the transmit beam or the receive beam, a size of the transmit antenna array, a size of the receive antenna array, a spacing of transmit antenna elements in the transmit antenna array, a spacing of receive antenna elements in the receive antenna array, or a beamwidth factor.

Aspect 14: The method of any one of aspects 1 through 13, further comprising: initiating a beam refinement training procedure for the receive beam or the transmit beam when the indication of the beam correspondence failure is transmitted to the second wireless communication device; and determining a refined receive beam or a refined transmit beam based on the beam refinement training procedure.

Aspect 15: The method of aspect 14, further comprising: indicating, to the second wireless communication device, a mapping of control information for at least one beam when the indication of the beam correspondence failure is transmitted to the second wireless communication device.

Aspect 16: The method of aspect 15, wherein the control information includes at least one of a synchronization signal block (SSB) index or a channel state information reference signal (CSI-RS) index.

Aspect 17: An apparatus for wireless communication, comprising: a memory; and at least one processor coupled to the memory and configured to perform a method of any one of aspects 1 through 16.

Aspect 18: An apparatus for wireless communication comprising at least one means for performing a method of any one of aspects 1 through 16.

Aspect 19: A computer-readable medium storing computer executable code, the code when executed by a processor cause the processor to perform a method of any one of aspects 1 through 16.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for a first wireless communication device including a transmit antenna array and a receive antenna array, the transmit antenna array being separate from the receive antenna array, comprising:
    forming a transmit beam in a first direction at the transmit antenna array and a receive beam in a second direction at the receive antenna array, wherein the transmit beam and the receive beam are formed for communication with a second wireless communication device;
    wherein the first direction and the second direction point toward at least one object capable of passively reflecting, diffracting, or scattering wireless communication signals along a non-line of sight (NLOS) communication link to or from the second wireless communication device;
    determining a signal strength threshold based on a difference between a peak gain value for the transmit beam or the receive beam and a threshold gain control value;
    determining a beam correspondence threshold based on a beamwidth of the transmit beam or a beamwidth of the receive beam, wherein the beamwidth of the transmit beam or the beamwidth of the receive beam is determined based on the signal strength threshold for the transmit beam or the receive beam;
    monitoring a difference between the first direction of the transmit beam and the second direction of the receive beam, wherein monitoring the difference comprises:
        determining a distance from the transmit antenna array or the receive antenna array to the at least one object; and
        determining a difference between the first direction and the second direction based on the distance from the transmit antenna array or the receive antenna array to the at least one object and a distance between the transmit antenna array and the receive antenna array; and
    transmitting an indication of a beam correspondence failure to the second wireless communication device when the difference between the first direction and the second direction is greater than or equal to a beam correspondence threshold.

2. The method of claim 1, wherein monitoring the difference between the first direction and the second direction is further based on at least one of a size of the transmit antenna array, a size of the receive antenna array, an arrangement of transmit antenna elements in the transmit antenna array, an arrangement of receive antenna elements in the receive antenna array, a set of beam weights associated with the transmit beam, and a set of beam weights associated with the receive beam.

3. The method of claim 1, wherein the difference between the first direction and the second direction is an angle formed between the first direction and the second direction.

4. The method of claim 1, wherein determining the distance from the transmit antenna array or the receive antenna array to the at least one object further comprises:
    receiving, from the second wireless communication device, at least one of a path loss estimate or information indicating a location of the at least one object capable of reflecting, diffracting or scattering wireless communication signals; and
    further determining the distance from the transmit antenna array or the receive antenna array to the at least one object based on the path loss estimate or the location of the at least one object capable of reflecting, diffracting or scattering wireless communication signals.

5. The method of claim 1, further comprising:
    transmitting an indication of the beam correspondence failure to the second wireless communication device when the distance is less than or equal to a distance threshold.

6. The method of claim 5, wherein the distance threshold is a value based on at least one of a beamwidth of the transmit beam or the receive beam, a size of the transmit antenna array, a size of the receive antenna array, a spacing of transmit antenna elements in the transmit antenna array, a spacing of receive antenna elements in the receive antenna array, or a beamwidth factor.

7. The method of claim 1, further comprising:
    initiating a beam refinement training procedure for the receive beam or the transmit beam when the indication of the beam correspondence failure is transmitted to the second wireless communication device; and
    determining a refined receive beam or a refined transmit beam based on the beam refinement training procedure.

8. The method of claim 7, further comprising:
    indicating, to the second wireless communication device, a mapping of control information for at least one beam when the indication of the beam correspondence failure is transmitted to the second wireless communication device.

9. The method of claim 8, wherein the control information includes at least one of a synchronization signal block (SSB) index or a channel state information reference signal (CSI-RS) index.

10. The method of claim 1, wherein the beamwidth corresponds to an intersection of the transmit beam or the receive beam and the signal strength threshold.

11. The method of claim 10, wherein the intersection corresponds to a pair of angles where a beam pattern of the transmit beam or the received beam intersects the signal strength threshold.

12. The method of claim 1, wherein, in response to the indication of a beam correspondence failure, performing separate beam training procedures to determine different transmit and receive beams.

13. The method of claim 1, further comprising determining the location of the at least one object using ray tracing and map-based information.

14. The method of claim 1, wherein the first wireless communication device comprises a base station.

15. A first apparatus for wireless communication, comprising:
    a transmit antenna array and a receive antenna array, the transmit antenna array being separate from the receive antenna array;
    a memory; and
    at least one processor coupled to the memory and configured to:
        form a transmit beam in a first direction at the transmit antenna array and a receive beam in a second direction at the receive antenna array, wherein the transmit beam and the receive beam are formed for communication with a second apparatus;

wherein the first direction and the second direction point toward at least one object capable of passively reflecting, diffracting, or scattering wireless communication signals along a non-line of sight (NLOS) communication link to or from the second wireless communication device;

determine a signal strength threshold based on a difference between a peak gain value for the transmit beam or the receive beam and a threshold gain control value;

determine a beam correspondence threshold based on a beamwidth of the transmit beam or a beamwidth of the receive beam, wherein the beamwidth of the transmit beam or the beamwidth of the receive beam is determined based on the signal strength threshold for the transmit beam or the receive beam;

monitor a difference between the first direction of the transmit beam and the second direction of the receive beam, including configuring the at least one processor to:

determine a distance from the transmit antenna array or the receive antenna array to the at least one object; and determine a difference between the first direction and the second direction based on the distance from the transmit antenna array or the receive antenna array to the at least one object and a distance between the transmit antenna array and the receive antenna array; and transmit an indication of a beam correspondence failure to the second apparatus when the difference between the first direction and the second direction is greater than or equal to a beam correspondence threshold.

16. The first apparatus of claim 15, wherein the at least one processor configured to monitor the difference between the first direction of the transmit beam and the second direction of the receive beam is further configured to:

further determine the difference between the first direction and the second direction based on at least one of a size of the transmit antenna array, a size of the receive antenna array, an arrangement of transmit antenna elements in the transmit antenna array, an arrangement of receive antenna elements in the receive antenna array, a set of beam weights associated with the transmit beam, and a set of beam weights associated with the receive beam.

17. The first apparatus of claim 15, wherein the difference between the first direction and the second direction is an angle formed between the first direction and the second direction.

18. The first apparatus of claim 15, wherein the at least one processor configured to determine the distance from the transmit antenna array or the receive antenna array to the at least one object is further configured to:

receive, from the second apparatus, at least one of a path loss estimate or information indicating a location of at least one object capable of reflecting, diffracting or scattering wireless communication signals; and further determine the distance from the transmit antenna array or the receive antenna array to the at least one object based on the path loss estimate or the location of the at least one object capable of reflecting, diffracting or scattering wireless communication signals.

19. The first apparatus of claim 15, wherein the at least one processor is further configured to:

transmit an indication of the beam correspondence failure to the second apparatus when the distance is less than or equal to a distance threshold.

20. The first apparatus of claim 15, wherein the at least one processor is further configured to:

initiate a beam refinement training procedure for the receive beam or the transmit beam when the indication of the beam correspondence failure is transmitted to the second apparatus; and determine a refined receive beam or a refined transmit beam based on the beam refinement training procedure.

21. The first apparatus of claim 20, wherein the at least one processor is further configured to:

indicate, to the second apparatus, a mapping of control information for at least one beam when the indication of the beam correspondence failure is transmitted to the second apparatus.

22. The first apparatus of claim 15, wherein the beamwidth corresponds to an intersection of the transmit beam or the receive beam and the signal strength threshold.

23. The first apparatus of claim 22, wherein the intersection corresponds to a pair of angles where a beam pattern of the transmit beam or the received beam intersects the signal strength threshold.

24. The first apparatus of claim 15, wherein, in response to the indication of a beam correspondence failure, the at least one processor is further configured to perform separate beam training procedures to determine different transmit and receive beams.

25. The first apparatus of claim 15, wherein the at least one processor coupled to the memory and is further configured to determine the location of the at least one object using ray tracing and map-based information.

26. The first apparatus of claim 15, wherein the first apparatus comprises a base station.

27. A first apparatus for wireless communication including a transmit antenna array and a receive antenna array, the transmit antenna array being separate from the receive antenna array, comprising:

means for forming a transmit beam in a first direction at the transmit antenna array and a receive beam in a second direction at the receive antenna array, wherein the transmit beam and the receive beam are formed for communication with a second apparatus, and wherein the first direction and the second direction point toward at least one object capable of passively reflecting, diffracting, or scattering wireless communication signals along a non-line of sight (NLOS) communication link to or from the second wireless communication device;

means determining a signal strength threshold based on a difference between a peak gain value for the transmit beam or the receive beam and a threshold gain control value;

means for determining a beam correspondence threshold based on a beamwidth of the transmit beam or a beamwidth of the receive beam, wherein the beamwidth of the transmit beam or the beamwidth of the receive beam is determined based on the signal strength threshold for the transmit beam or the receive beam;

means for monitoring a difference between the first direction of the transmit beam and the second direction of the receive beam, wherein the means for monitoring comprises:

means for determining a distance from the transmit antenna array or the receive antenna array to the at least one object; and means for determining a difference between the first direction and the second direction based on the distance from the transmit antenna array or the receive antenna array to the at least one object and a distance between the transmit antenna array and the receive antenna array; and means for transmitting an indication of a beam correspondence failure to the second apparatus when the difference between the first direction and the second direction is greater than or equal to a beam correspondence threshold.

28. The first apparatus of claim 27, wherein the first apparatus comprises a base station.

29. The first apparatus of claim 27, further comprising means for determining the location of the at least one object using ray tracing and map-based information.

30. A non-transitory computer-readable medium storing computer executable code, the code when executed by a processor causes the processor to:

form a transmit beam in a first direction at a transmit antenna array and a receive beam in a second direction at a receive antenna array, wherein the transmit antenna array is separate from the receive antenna array, and wherein the transmit beam and the receive beam are formed for communication with a wireless communication device;

wherein the first direction and the second direction point toward at least one object capable of passively reflecting, diffracting, or scattering wireless communication signals along a non-line of sight (NLOS) communication link to or from the second wireless communication device;

determine a signal strength threshold based on a difference between a peak gain value for the transmit beam or the receive beam and a threshold gain control value;

determine a beam correspondence threshold based on a beamwidth of the transmit beam or a beamwidth of the receive beam, wherein the beamwidth of the transmit beam or the beamwidth of the receive beam is determined based on the signal strength threshold for the transmit beam or the receive beam;

monitor a difference between the first direction of the transmit beam and the second direction of the receive beam, comprising code that causes the processor to:

determine a distance from the transmit antenna array or the receive antenna array to the at least one object;

determine a difference between the first direction and the second direction based on the distance from the transmit antenna array or the receive antenna array to the at least one object and a distance between the transmit antenna array and the receive antenna array; and transmit an indication of a beam correspondence failure to the wireless communication device when the difference between the first direction and the second direction is greater than or equal to a beam correspondence threshold.

* * * * *